(12) United States Patent
Trent, III et al.

(10) Patent No.: US 9,550,395 B2
(45) Date of Patent: *Jan. 24, 2017

(54) WHEEL ASSEMBLY

(71) Applicant: Toter, LLC, Charlotte, NC (US)

(72) Inventors: Smith Edward Trent, III, Statesville, NC (US); Todd Ernest Wright, Statesville, NC (US)

(73) Assignee: Toter, LLC, Charlotte, NC (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/750,548

(22) Filed: Jun. 25, 2015

(65) Prior Publication Data

US 2015/0306911 A1    Oct. 29, 2015

Related U.S. Application Data

(63) Continuation of application No. 13/692,878, filed on Dec. 3, 2012, now Pat. No. 9,096,097.

(60) Provisional application No. 61/566,327, filed on Dec. 2, 2011.

(51) Int. Cl.
| | |
|---|---|
| *B60B 37/10* | (2006.01) |
| *B60B 37/06* | (2006.01) |
| *B62B 1/10* | (2006.01) |
| *B65F 1/14* | (2006.01) |

(52) U.S. Cl.
CPC .............. *B60B 37/10* (2013.01); *B60B 37/06* (2013.01); *B62B 1/10* (2013.01); *B65F 1/1473* (2013.01); *B60B 2200/41* (2013.01); *B60B 2200/43* (2013.01); *B60B 2310/204* (2013.01); *B60B 2900/3312* (2013.01)

(58) Field of Classification Search
None
See application file for complete search history.

(56) References Cited

U.S. PATENT DOCUMENTS

| | | | | | |
|---|---|---|---|---|---|
| 3,415,530 | A | * | 12/1968 | Scheib | A63C 9/08 280/619 |
| 3,677,566 | A | * | 7/1972 | Lawrence | A63C 9/0847 280/631 |
| 3,961,802 | A | * | 6/1976 | Vannatter | A63C 9/001 280/631 |
| 4,624,474 | A | * | 11/1986 | Klubitschko | A63C 9/0846 280/612 |
| 5,265,901 | A | * | 11/1993 | Gorza | A63C 7/1013 280/605 |
| 5,582,322 | A | * | 12/1996 | Prout | B29C 33/0033 220/771 |

(Continued)

*Primary Examiner* — John Walters
*Assistant Examiner* — Hilary L Johns
(74) *Attorney, Agent, or Firm* — Nelson Mullins Riley & Scarborough LLP

(57) ABSTRACT

A wheel assembly is provided which includes a wheel, an axle, and an axle-engaging wheel hub for mounting the wheel to the axle. A wheel assembly is provided which includes a wheel, an axle, and a wheel hub which is adapted for use with a fastener for mounting the wheel to the axle. A wheel assembly is provided which includes a wheel that is adapted to receive either an axle-engaging wheel hub or a wheel hub which is adapted for use with a fastener for mounting the wheel to the axle depending upon the preference of the assembler. Wheeled containers and methods of assembly thereof are also provided for use with such wheel assemblies.

21 Claims, 19 Drawing Sheets

(56) References Cited

U.S. PATENT DOCUMENTS

| | | | | |
|---|---|---|---|---|
| 6,464,305 B2* | 10/2002 | Markling | ............... | B60B 37/10 264/271.1 |
| 7,318,598 B2* | 1/2008 | Howell | .................. | A63C 9/001 280/626 |
| 7,481,498 B1* | 1/2009 | Morris | .................... | B60B 3/001 152/324 |
| 7,523,953 B2* | 4/2009 | Ettlinger | ............... | A63C 9/081 280/14.23 |
| 7,591,592 B2* | 9/2009 | Beirne | .................. | B65F 1/1473 301/111.01 |
| 7,614,707 B2* | 11/2009 | Jabbour, Jr. | ............ | B60B 3/001 301/111.01 |
| 7,621,543 B2* | 11/2009 | Arendt | .................... | B29C 49/54 152/209.1 |
| 7,905,305 B2* | 3/2011 | Lucas | ...................... | B60C 7/00 180/65.1 |
| 7,971,940 B2* | 7/2011 | Skov | ....................... | B29C 49/04 301/105.1 |
| D683,099 S | 5/2013 | Wright et al. | | |
| D683,100 S | 5/2013 | Wright et al. | | |
| 8,590,984 B2* | 11/2013 | Morris | ................. | B65F 1/1473 301/111.01 |
| 8,616,657 B2* | 12/2013 | Morris | ................... | B60B 37/10 301/111.04 |
| 2002/0038973 A1* | 4/2002 | Godwin | ............... | B65F 1/1473 301/111.04 |

\* cited by examiner

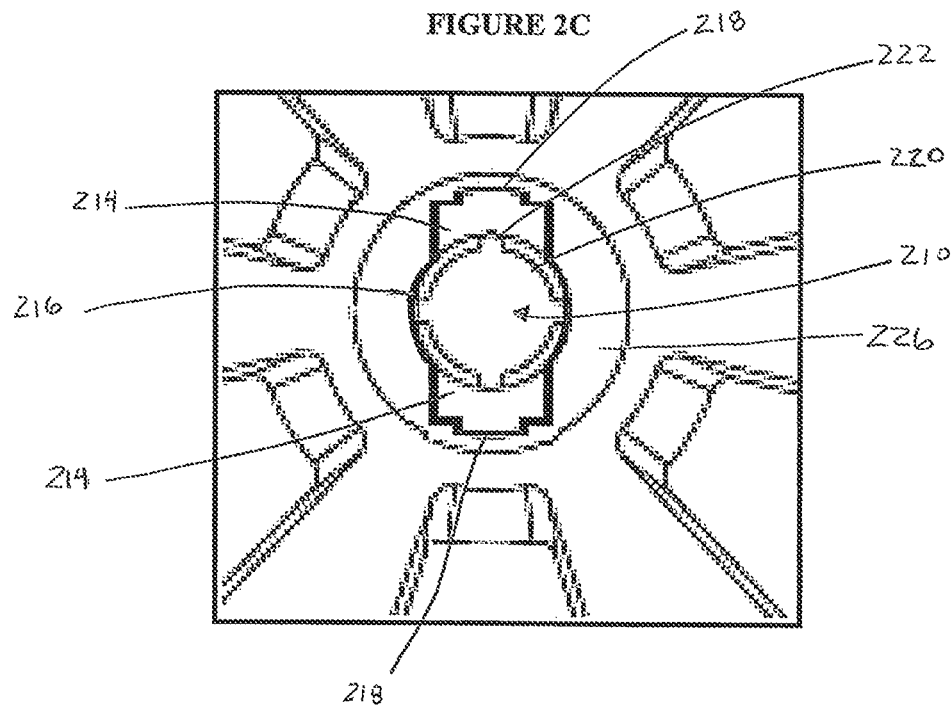
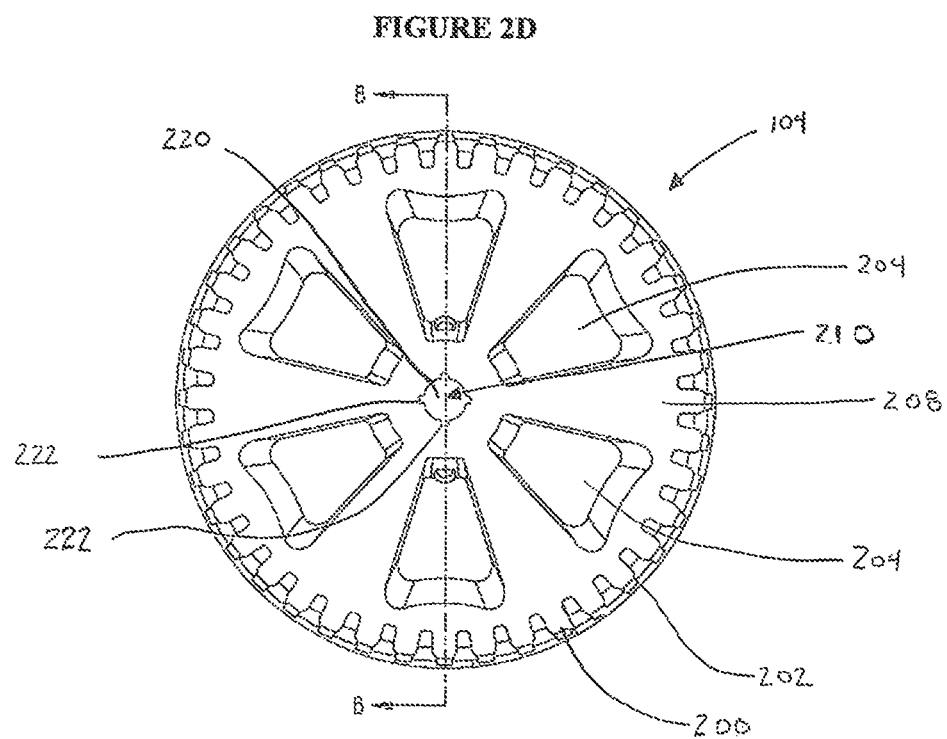

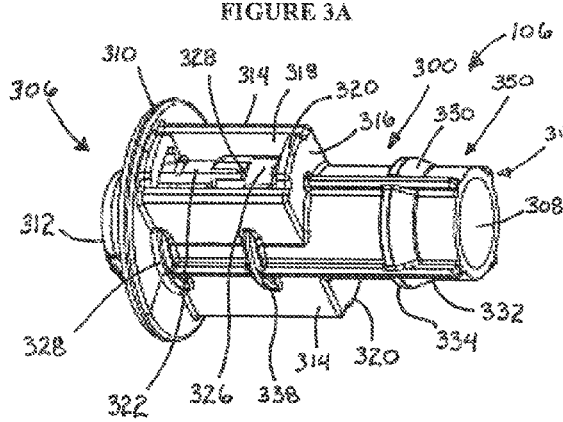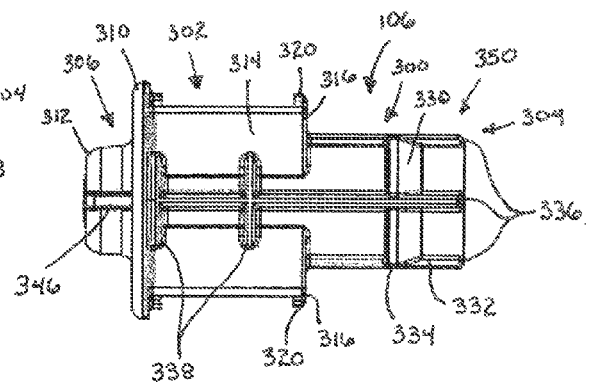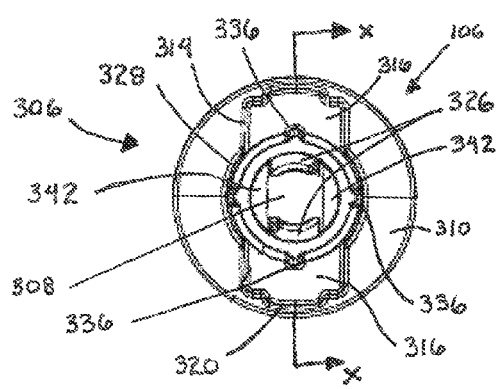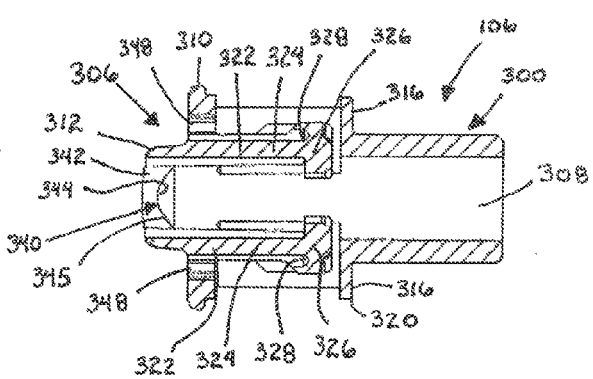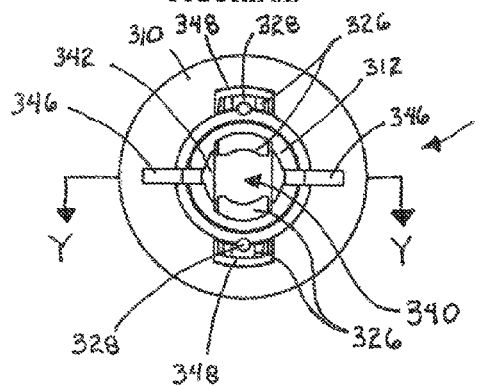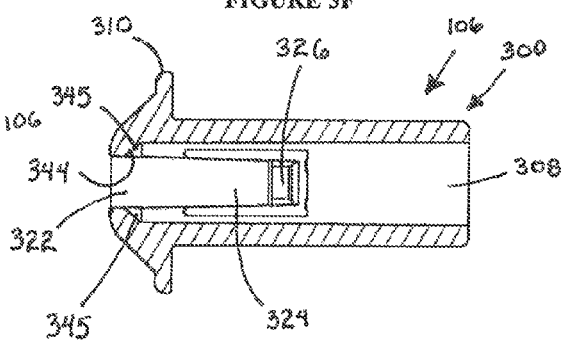

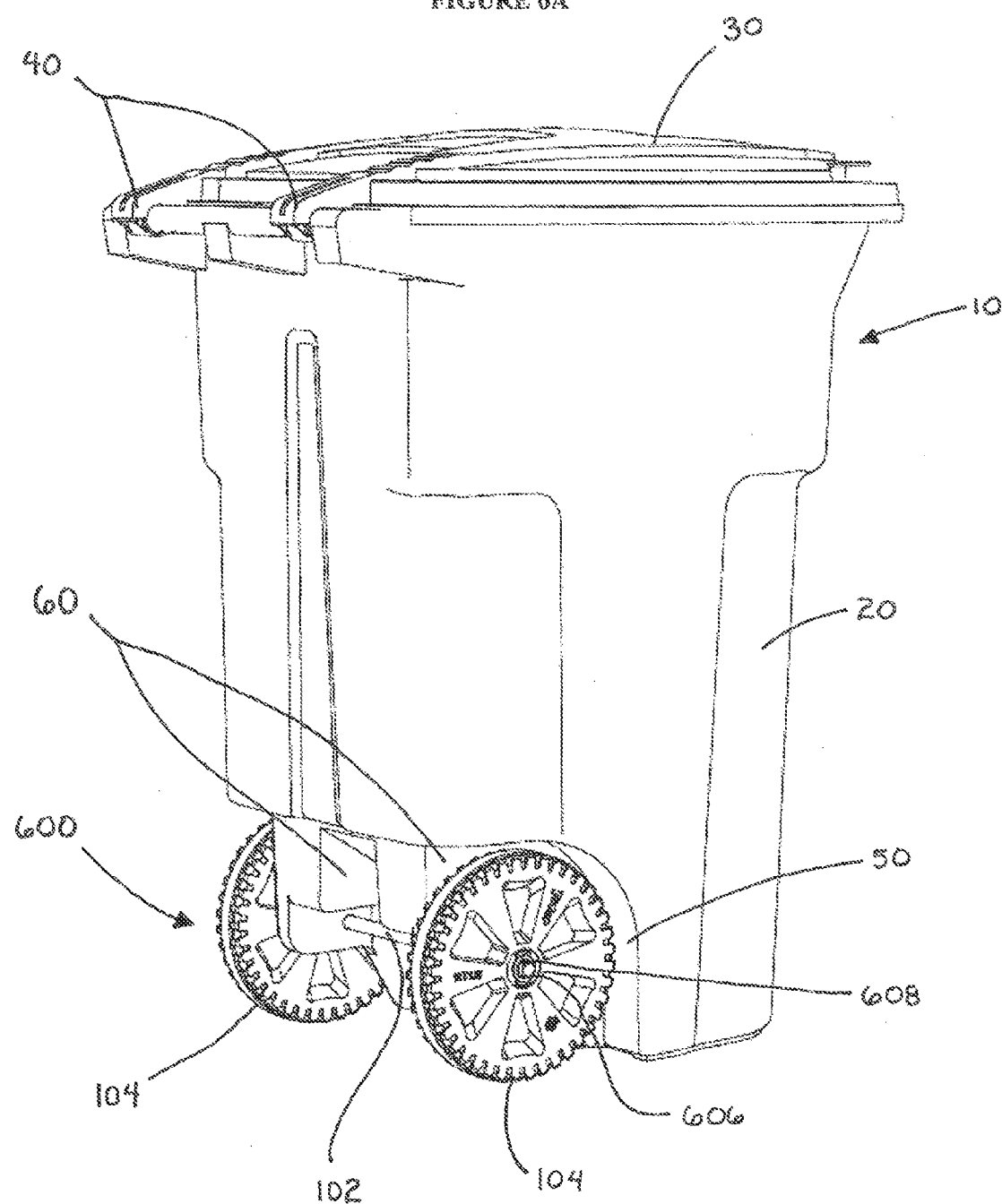

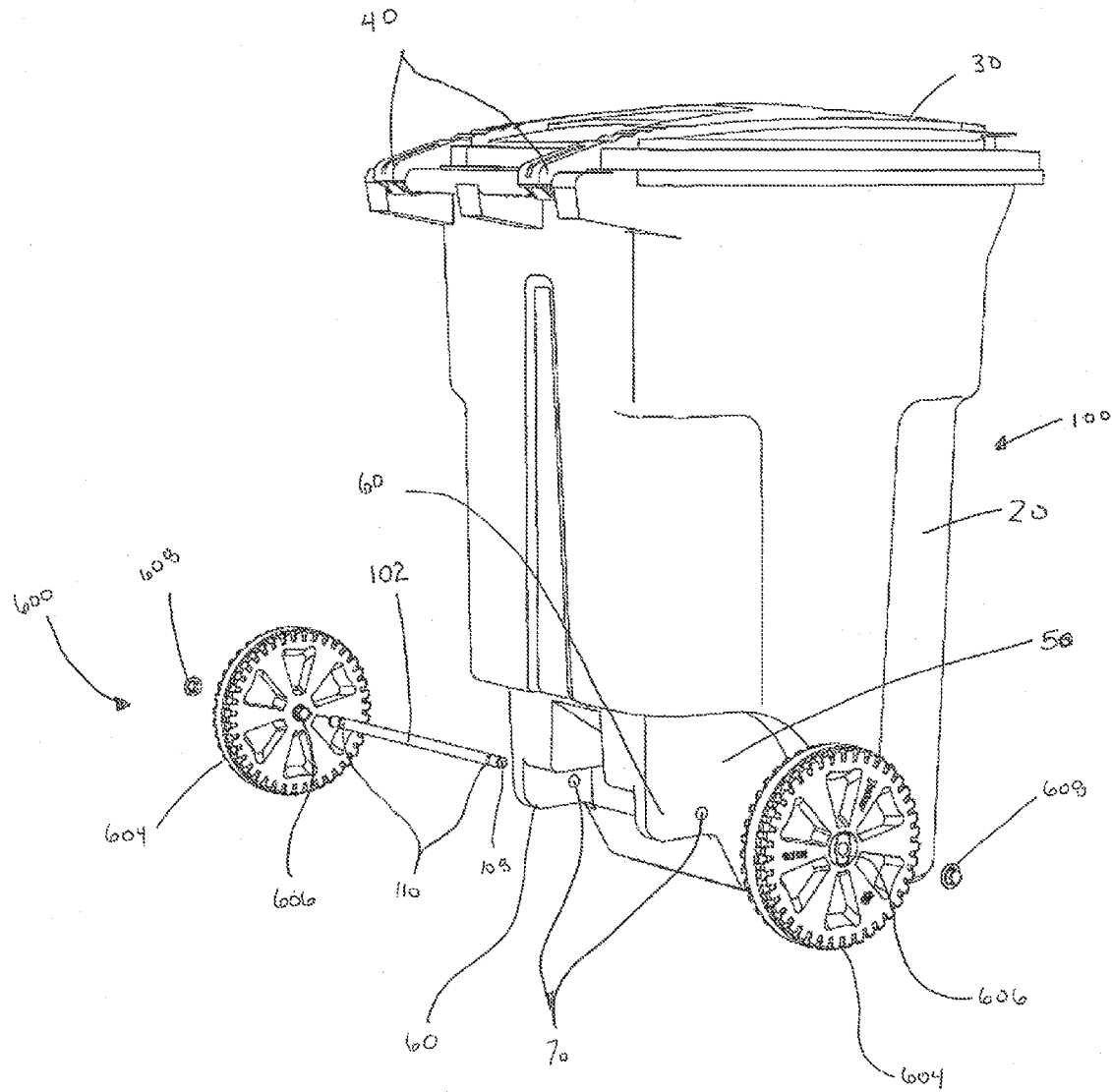

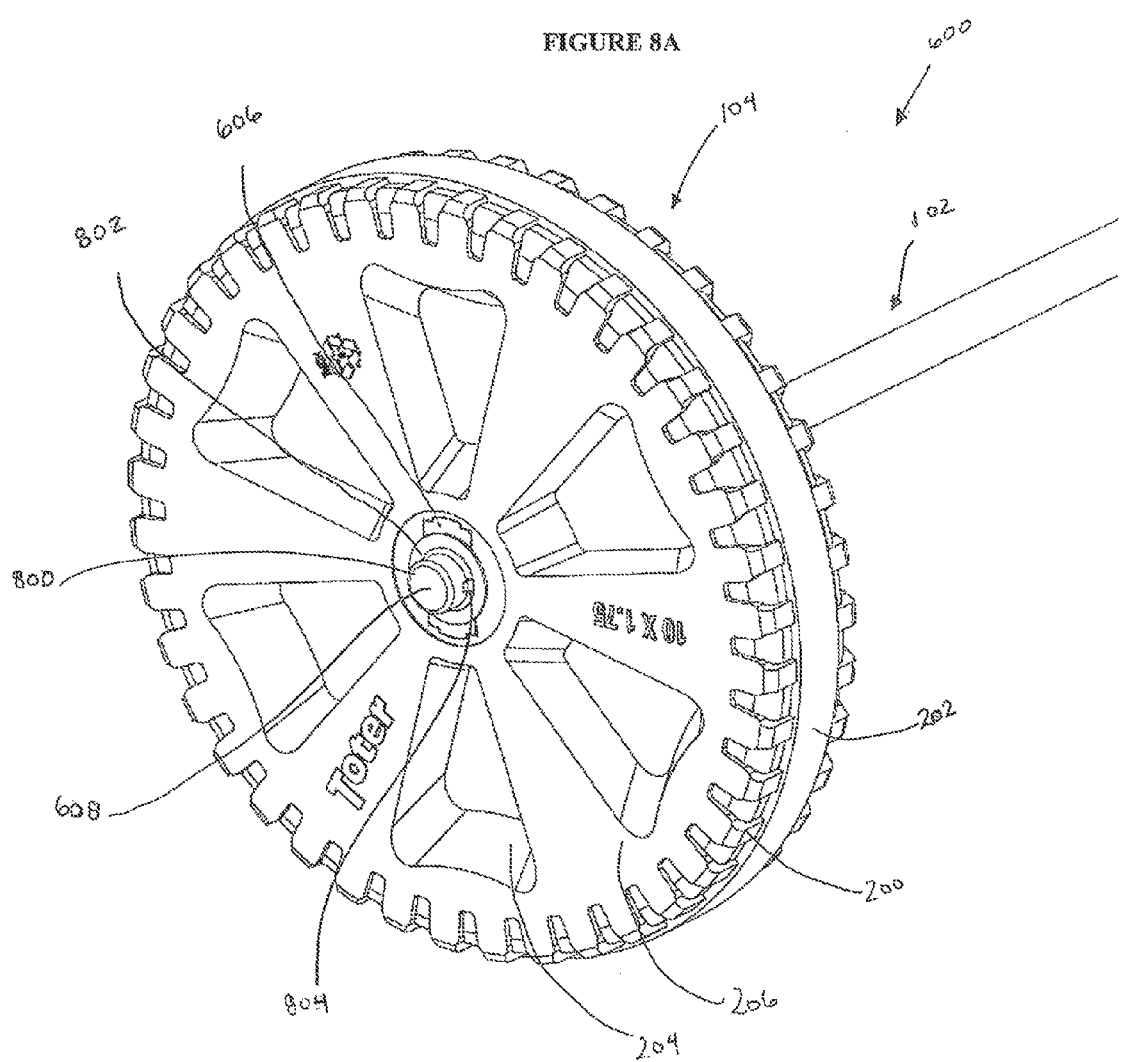

WHEEL ASSEMBLY

RELATED APPLICATION

This application is a continuation application under 35 U.S.C. §120 of U.S. patent application Ser. No. 13/692,878, entitled WHEEL ASSEMBLY, filed Dec. 3, 2012, now U.S. Patent Application Publication No. 2013/0334782 which claims the benefit under 35 U.S.C. §119(e) of U.S. Provisional Patent Application Ser. No. 61/566,327, entitled WHEEL ASSEMBLY, filed on Dec. 2, 2011, which are hereby incorporated by reference in their respective entireties.

TECHNICAL FIELD

The invention is generally applicable to a wheel assembly. More specifically, the invention is applicable to a wheel assembly for coupling a wheel to an axle for use with wheeled containers. The wheeled containers are particularly useful for the collection of trash, refuse and recyclable materials.

BACKGROUND

Many containers, including trash containers, include wheels to permit the containers and their contents to be easily moved and transported. With such wheeled containers, it is often desirable to ensure that the wheels are securely coupled to an axle of the wheeled containers. Accordingly, there is a general need to provide wheeled containers with wheels that can be securely coupled to an axle of the container.

SUMMARY

According to one inventive aspect of the present invention, a wheeled container is provided with a wheel assembly which includes a wheel, an axle, and an axle-engaging wheel hub for mounting the wheel to the axle. According to one inventive aspect of the present invention, a wheeled container is provided with a wheel assembly which includes a wheel, an axle, and a wheel hub which is adapted for use with a fastener for mounting the wheel to the axle. According to one inventive aspect of the present invention a wheeled container is provided which includes a wheel that is adapted to receive either an axle-engaging wheel hub or a wheel hub which is adapted for use with a fastener for mounting the wheel to the axle depending upon the preference of the assembler.

According to one inventive aspect of the present invention, a wheel assembly is provided which includes a wheel, an axle, and an axle-engaging wheel hub for mounting the wheel to the axle. According to one inventive aspect of the present invention, a wheel assembly is provided which includes a wheel, an axle, and a wheel hub which is adapted for use with a fastener for mounting the wheel to the axle. According to one inventive aspect of the present invention a wheel assembly is provided which includes a wheel that is adapted to receive either an axle-engaging wheel hub or a wheel hub which is adapted for use with a fastener for mounting the wheel to the axle depending upon the preference of the assembler.

According to one inventive aspect of the present invention, a wheel is provided that is adapted to receive either an axle-engaging wheel hub or a wheel hub which is adapted for use with a fastener for mounting the wheel to the axle depending upon the preference of the assembler.

Features and advantages of the invention will be set forth in part in the description which follows, and in part will be obvious from the description, or may be learned by practice of the invention. The accompanying drawings, which are incorporated in and constitute a part of this specification, illustrate several embodiments of the invention, and together with the description, serve to explain the principles of the invention.

BRIEF DESCRIPTION OF THE DRAWINGS

FIG. 2C shows a magnified front view of the wheel bore of the wheel in FIG. 2A;

FIG. 2D shows a rear view of the embodiment of the wheel in FIG. 2A;

FIG. 3A shows a perspective view of one embodiment of a wheel hub of the wheel assembly shown in FIGS. 1A-1B;

FIG. 3B shows a side view of the embodiment of the wheel hub in FIG. 3A;

FIG. 3C shows a rear end view of the embodiment of the wheel hub in FIG. 3A;

FIG. 3D shows a cross-sectional view of the embodiment of the wheel hub in FIG. 3A taken along plane X-X in FIG. 3C;

FIG. 3E shows a front end view of the embodiment of the wheel hub in FIG. 3A;

FIG. 3F shows a cross-sectional view of the embodiment of the wheel hub in FIG. 3A taken along plane Y-Y in FIG. 3E;

FIG. 6A shows a perspective view of an additional embodiment of a trash container and wheel assembly;

FIG. 6B shows a partially exploded perspective view of the embodiment of trash container and wheel assembly shown in FIG. 6A;

FIG. 8A shows a perspective view of the wheel assembly of FIGS. 6A-6B;

DETAILED DESCRIPTION OF THE INVENTION

Figure 1A:
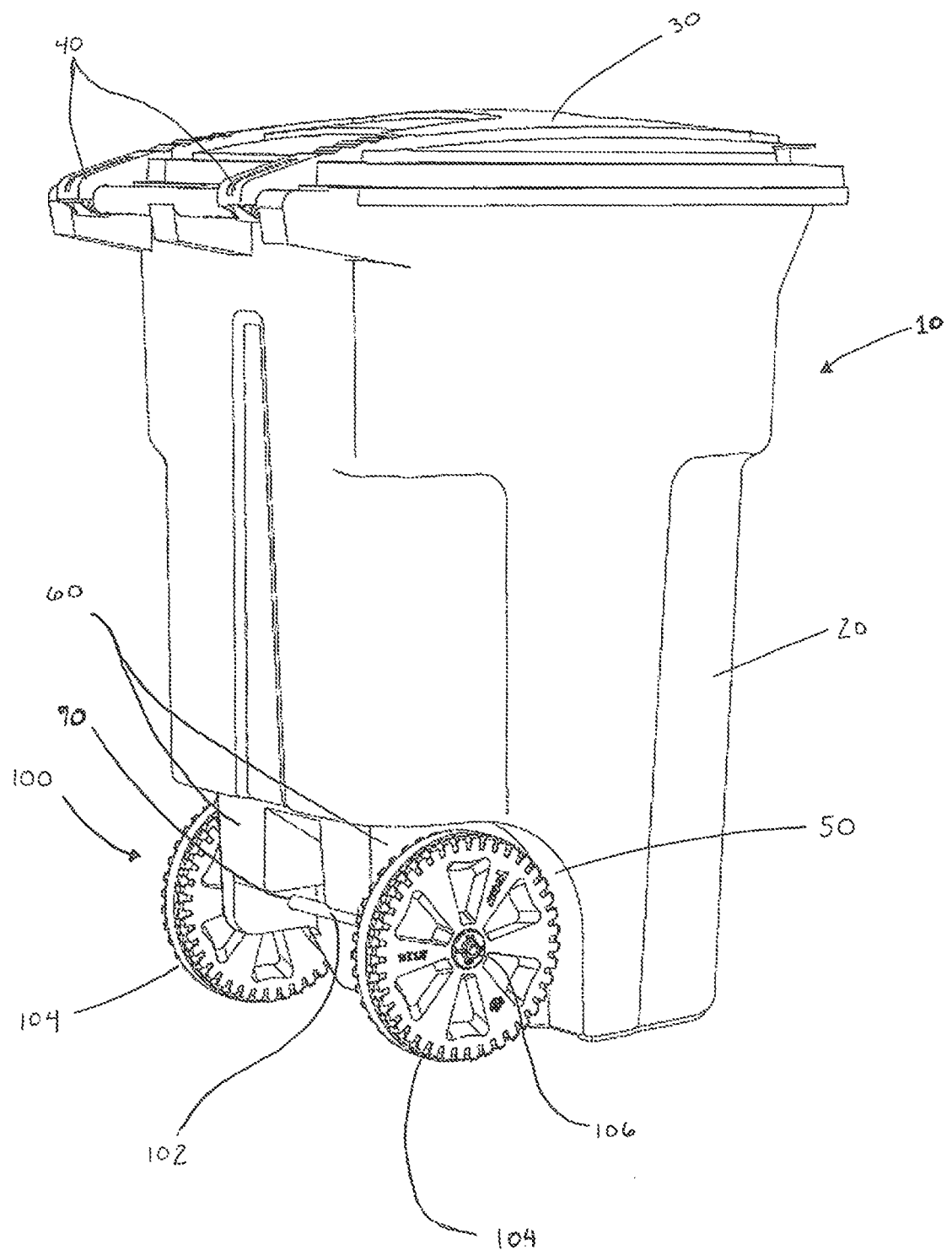
FIG. 1A shows a perspective view of one embodiment of a trash container and wheel assembly.

The present invention will now be described with occasional reference to specific embodiments of the invention. This invention may, however, be embodied in different forms and should not be construed as limited to the embodiments set forth herein. Rather, these embodiments are provided so that this disclosure will fully convey the scope of the invention to those skilled in the art and are not intended to limit the scope of the invention in any way.

Also, while the detailed exemplary embodiments described in the specification and illustrated in the drawings relate to wheel assemblies for use with wheeled containers for the collection, storage and transport of waste and refuse materials, it should be understood that the wheel assemblies described herein may be used in connection with any wheeled device or container and the wheel assemblies described herein are not limited to use with waste or refuse containers only. For example, the wheel assemblies described herein may be used in connection with wheelbarrows, wagons, garden carts, trailers, wheeled carts having a variety of uses, and other wheeled devices.

Except as otherwise specifically defined herein, all terms used herein have the same meaning as commonly understood by one of ordinary skill in the art to which this invention belongs. The terminology used in the description of the invention herein is for describing particular embodiments only, and is not intended to be limiting of the invention. As used in the description of the invention, the singular forms "a," "an," and "the" are intended to include the plural forms as well, unless the context clearly indicates otherwise.

Unless otherwise indicated, all numbers expressing quantities, properties, and so forth as used in the specification are to be understood as being modified in all instances by the term "about." Accordingly, unless otherwise indicated, the numerical properties set forth in the following specification are approximations that may vary depending on the desired properties sought to be obtained in embodiments of the present invention. Notwithstanding that the numerical ranges and parameters setting forth the broad scope of the invention are approximations, the numerical values to the extent that such are set forth in the specific examples are reported as precisely as possible. Any numerical values, however, inherently contain certain errors necessarily resulting from error found in their respective measurements.

Figure 1B:
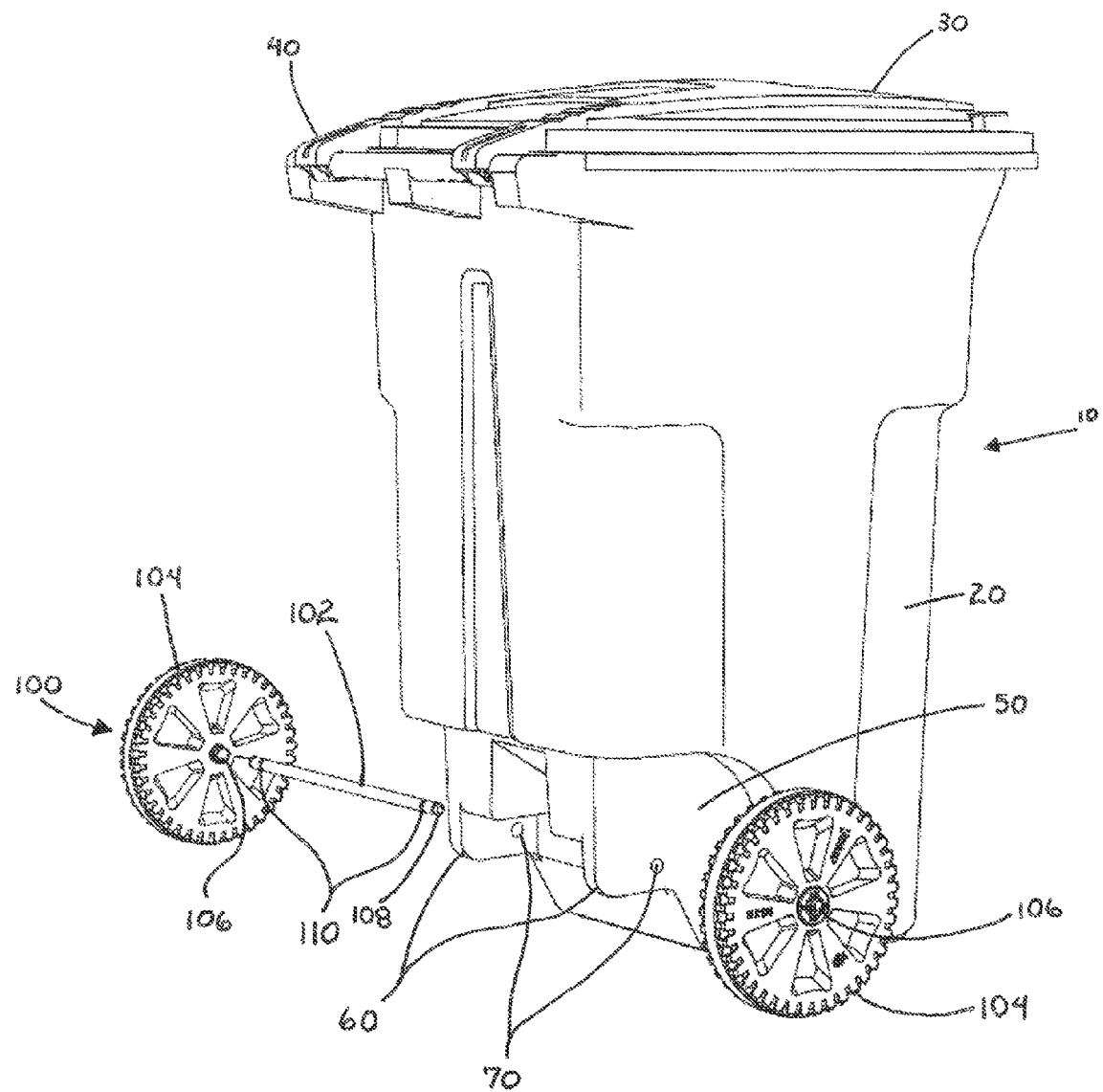
FIG. 1B shows a partially exploded perspective view of the embodiment of the trash container and wheel assembly shown in FIG. 1A.

FIGS. 1A-1B show one exemplary embodiment of a wheeled container 10 which includes one exemplary embodiment of wheel assembly 100. Referring to FIGS. 1A-1B, the container 10 includes a walled receptacle portion 20 and lid 30, which combine to form an enclosed space. The lid 30 is attached to the receptacle portion 20 with a plurality of hinges 40. However, additional embodiments of container 10 may not include a lid or may include a lid that is not connected to the receptacle portion 20 or is connected to the receptacle portion by a mechanism other than hinges.

The shape and configuration of the wheeled container 10 may vary in various embodiments. As shown in FIGS. 1A-1B, the exemplary embodiment of the container 10 has a generally four-sided polygonal shape when viewed from the top. However, the container 10 is not limited to the shape of the exemplary embodiment of container 10 and additional embodiments of the container could have a variety of suitable shapes.

A container 10 according to the present invention may be formed of one or more of a variety of suitable materials. The particular material is generally selected to be compatible with the intended contents and purpose and desired qualities of the container 10. For example, in various embodiments, the container 10 may be made from one or a combination of thermoplastic or elastomeric materials, such as plastic. In various additional embodiments, the container 10 may be made from one or a combination of metals, such as steel or aluminum.

A container 10 according to the present invention may be manufactured by one of a variety of methods of making containers that are well known in the art. Good results are obtained using rotational, injection or blow molding processes with a variety of thermoplastic and elastomeric materials. Accordingly, in various embodiments according to the instant invention, a container 10 may be made from one or a combination of thermoplastic or elastomeric materials, such as: polyesters, Polycarbonate (PC), polypropylene (PP), polyethylene (PE), High Density Polyethylene (HDPE), Low Density Polyethylene (LDPE), Polyvinyl Chloride (PVC), polyester terphthalate, butadiene-styrene co-polymers, polyamides, ethylene-vinyl-alcohol copolymer, polyethylene napthaphthalate, thermoplastic and thermosetting resins, polybutylene terephthalate, polyoxymethylenes, polyphenylene, polyphenylene sulfides, polyphenylene oxides, polymethylmethacrylate, polyethylene-terephthalate (PET), polyvinylidenechloride, polymethylpentene-1, nylon 6, nylon 66, Polyethylene Terephthalate Modified with CHDM (PETG), and mixtures thereof.

Referring again to FIGS. 1A-1B, the container 10 includes a pair of wheel receiving recesses 50. The wheel receiving recesses 50 of the illustrated embodiment of container 10 are adapted to protect the wheels from damage when the container 10 is in use and to allow for multiple containers 10 to be stacked even when wheels are mounted to the containers 10. The wheel receiving recesses 50 may have a variety of sizes, shapes and configurations in additional embodiments of the container 10. Additional embodiments of container 10 may include more than a pair of recesses 50. For example, if the wheeled container 10 is a wheeled cart, the container 10 may include four wheel receiving recesses 50. In yet additional embodiments of container 10, no wheel receiving recesses 50 may be included and the wheels may be mounted to the container in a non-recessed manner.

The illustrated embodiment of container 10 includes a pair of wheel assembly mounting portions 60, which extend from container and include an axle bore 70 defined therethrough. The wheel assembly mounting portions 60 may have a variety of sizes, shapes and configurations in additional embodiments of the container 10. Additional embodiments of container 10 may include more than a pair of wheel assembly mounting portions 60. For example, if the wheeled container 10 is a wheeled cart, the container 10 may include four wheel assembly mounting portions 60. In yet additional embodiments of container 10, no wheel assembly mounting portions 60 may be included and the wheels may be mounted directly to the walls of the container.

Axle-engaging Wheel Assembly: Referring again to FIGS. 1A-1B, the illustrated embodiment of wheeled container 10 includes a wheel assembly 100. The wheel assembly 100 of the illustrated embodiment generally includes an axle 102, a pair of wheels 104, and a pair of wheel hubs 106. Wheel assembly 100 is mounted to container 10 by the axle 102, which extends through the axle bore 70 defined through wheel assembly mounting portions 60 of container 10. A wheel hub 106 retains each wheel 104 on axle 102. As described in greater detail herein, wheel hub 106 is an axle-engaging wheel hub that mounts within wheel 104 and subsequently mounts onto axle 102 without the need for any additional fasteners.

While the wheel assembly 100 of the illustrated embodiment includes one axle and a pair of wheels and wheel hubs, additional embodiments of wheel assembly 100 may include different numbers of axles, wheels or wheel hubs. For example, various additional embodiments may include two axles and a pair of wheels, with each wheel being mounted to the container with its own axle. In addition, various additional embodiments of the wheel assembly may include different numbers of wheels, such as one wheel, three wheels, four wheels, etc., which are mounted to one or more axles by one or more wheel hubs.

Referring to FIG. 1B, the axle 102 of the illustrated embodiment of wheel assembly is an elongated rod formed from a suitable material. For example, in various embodiments, the axle 102 may be made from one or a combination of metals, such as steel or aluminum or one or a combination of thermoplastic or elastomeric materials, such as plastic. The axle 102 of the illustrated embodiment includes chamfered ends 108. However, additional embodiments of the wheel assembly 100 may include an axle which does not include chamfered ends. The axle 102 of the illustrated embodiment includes notches 110 defined near each of the chamfered ends 108 which extend radially inwardly from an outer surface of the axle 102 and engage with the wheel hubs 106 (as described in more detail herein) to retain the wheels 102 on the axle 102. The notches 110 of the illustrated embodiment have a generally rectangular cross sectional shape, however additional embodiments of the axle 102 may have a variety of suitable shapes. The notches 110 of the illustrated embodiment are defined around the entire circumference of the axle 102, however additional various embodiments of the axle 102 may include notches which are only defined within a portion of the circumference of the axle. In yet further additional embodiments of the axle 102, may include one or more projections extending from the axle or other features defined within or structures projecting from the axle 102, which engage with the wheel hub 106 for retaining the wheels 104 on the axle 102. As mentioned previously, while the wheel assembly 100 of the illustrated embodiment includes one axle, additional embodiments of wheel assembly 100 may include different numbers of axles. For example, various additional embodiments may include a pair of axles.

To mount the wheel assembly 100 of the illustrated embodiment to container 10, axle 102 is inserted through the axle bore 70 defined through the wheel assembly mounting portions 60 of container 10 and a wheel 104 is attached to each opposing end of the axle 102 by wheel hub 106 which engages notch 110 defined within the axle 102 (as described in more detail herein).

Referring now to FIGS. 2A-2E, the illustrated embodiment of wheel 104 of wheel assembly 100 includes a tread 200 positioned on an outer surface extending around the circumference. A raised, generally flat band 202 extends around the outer surface of the circumference of the wheel 104 in the center of the tread 200. The illustrated embodiment of wheel 104 includes a plurality of indentations 204 defined within an outer face 206 and inner face 208 of wheel 104. However, additional embodiments of wheel assembly 100 may include wheels 105 having a variety of different shapes and configurations. For example, additional embodiments of wheel 104 may not include a tread 200, raised band 202, or indentations 204 defined on the outer face 206 and/or inner face 208 of wheel 104.

A wheel 104 according to the present invention may be formed of one or more of a variety of suitable materials. The particular material is generally selected to be compatible with the desired qualities of the wheel 104. For example, in various embodiments, the wheels 104 may be made from one or a combination of thermoplastic or elastomeric materials, such as plastic. In various additional embodiments, the wheels 104 may be made from one or a combination of metals, such as steel or aluminum.

A wheel 104 according to the present invention may be manufactured by one of a variety of methods of making wheels and other container components that are well known in the art. The wheel 104 of the illustrated embodiment is formed by a blow molding process using a High Density Polyethylene (HDPE). However, good results are also obtained using rotational or injection molding processes with a variety of other thermoplastic and elastomeric materials. Accordingly, in various additional embodiments according to the instant invention, wheels 104 may also be made from one or a combination of thermoplastic or elastomeric materials, such as: polyesters, Polycarbonate (PC), polypropylene (PP), polyethylene (PE), Low Density Polyethylene (LDPE), Polyvinyl Chloride (PVC), polyester terphthalate, butadiene-styrene co-polymers, polyamides, ethylene-vinyl-alcohol copolymer, polyethylene napthaphthalate, thermoplastic and thermosetting resins, polybutylene terephthalate, polyoxymethylenes, polyphenylene, polyphenylene sulfides, polyphenylene oxides, polymethylmethacrylate, polyethylene-terephthalate (PET), polyvinylidenechloride, polymethylpentene-1, nylon 6, nylon 66, Polyethylene Terephthalate Modified with CHDM (PETG), and mixtures thereof.

Referring again to FIGS. 2A-2E, the illustrated embodiment of wheel 104 includes a wheel hub receiving cavity 210 defined through center 212 of wheel 104. The wheel hub receiving cavity 210 may have a variety of different sizes, shapes and configurations in various embodiments of the wheel assembly 100 of the present invention. As best illustrated in FIG. 2F, wheel hub receiving cavity 210 includes an outer cavity portion 210a opening to outer face 206 of wheel 104 and an inner cavity portion 210b opening to inner face 208 of wheel 104.

Figure 2A:
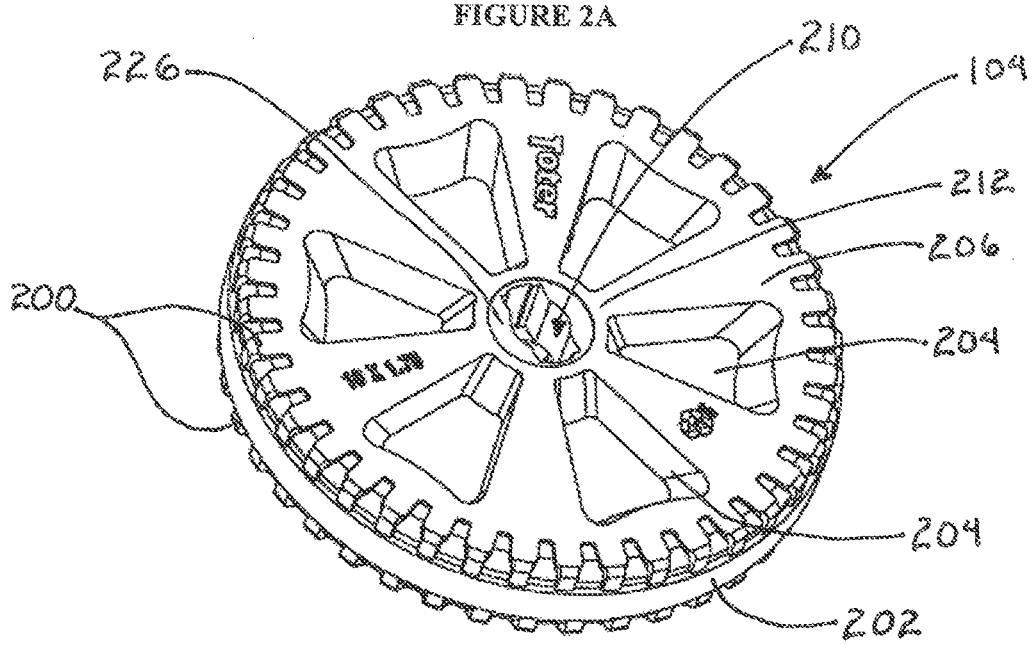
FIG. 2A shows a perspective view of one embodiment of a wheel of the wheel assembly of FIGS. 1A-1B.
Figure 2B:
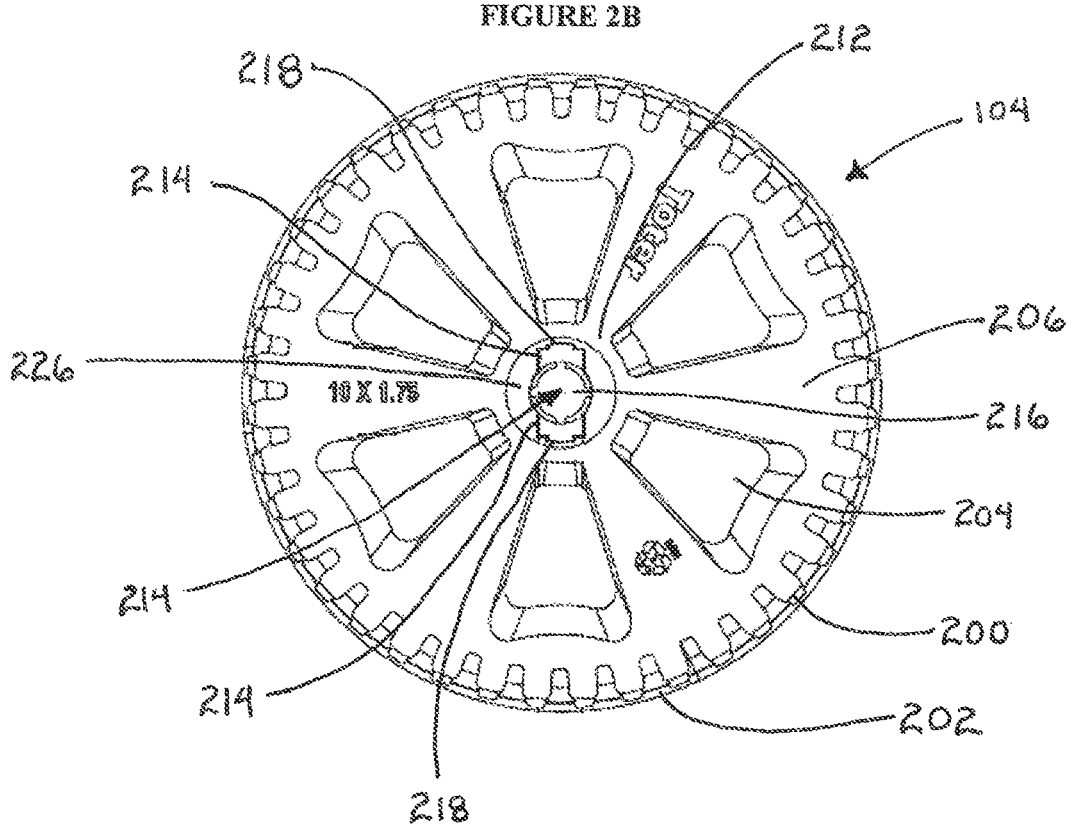
FIG. 2B shows a front view of the embodiment of the wheel in FIG. 2A.
Figure 2E:
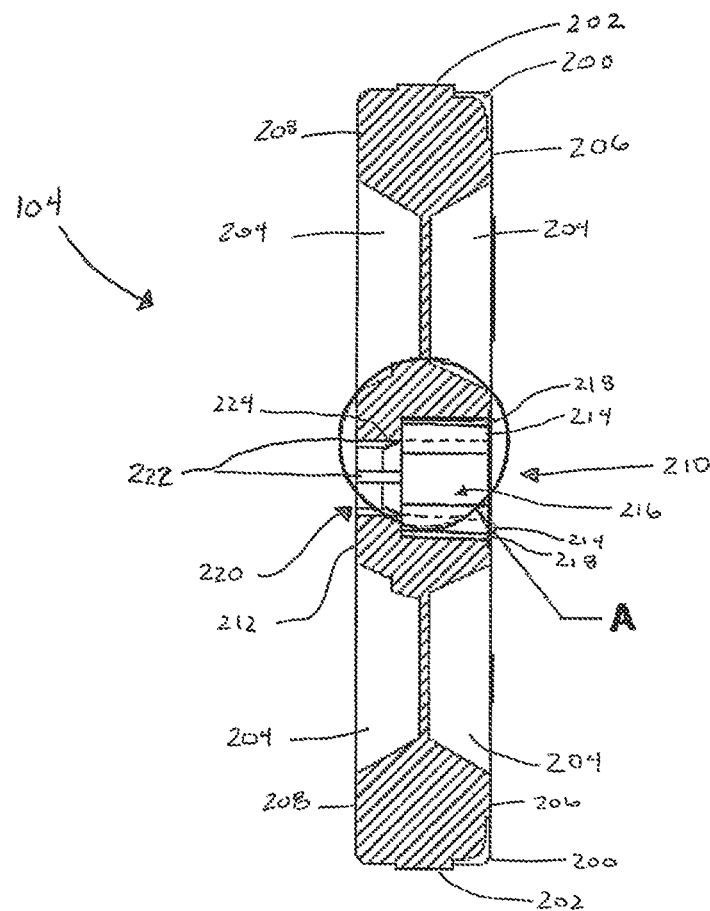
FIG. 2E shows a cross-sectional view of the embodiment of the wheel in FIG. 2A taken along plane B-B in FIG. 2D.
Figure 2F:
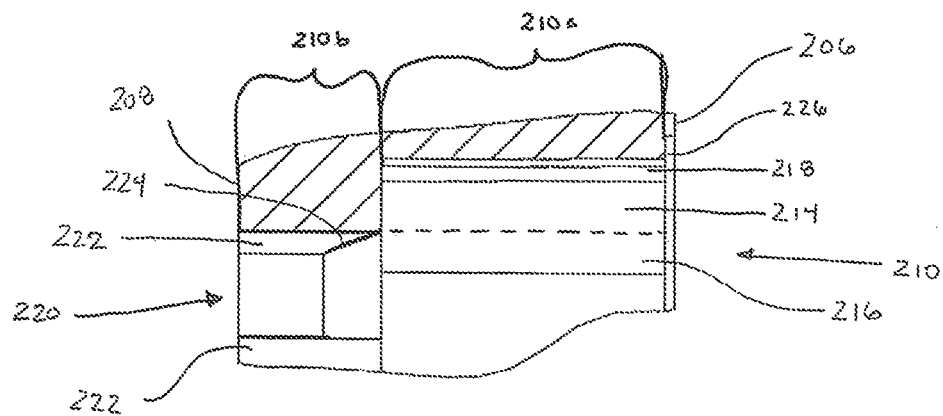
FIG. 2F shows a magnified view of section A of the cross-sectional view of the embodiment of the wheel FIG. 2E.

As best shown in FIGS. 2B-2C, the outer cavity portion 210a of the illustrated embodiment includes a rectangular shaped aperture 214 which is bisected by a central bore 216. Notches 218 extend from the top and bottom of rectangular aperture 214. Referring now to FIG. 2D, the inner cavity portion 210b of the illustrated embodiment includes a central bore 220 which is divided into four equal radii portions by notches 222 which extend radially outward from the central bore 220 of the inner cavity portion 210b. As best shown in FIG. 2E, notches 222 extend the entire length of inner cavity portion 210b. As best shown in FIGS. 2C and 2E, central bore 216 of outer cavity portion 210a (diameter of central bore 210 of outer cavity portion 210 is set forth in broken lines in FIG. 2E) has a larger diameter than central bore 220 of the inner cavity portion 210b. The diameter central bore 220 of the inner cavity portion 210b tapers out to the diameter of central bore 216 of outer cavity portion 210a at step 224 (i.e., the combined bore formed by central bore 216 and central bore 220 has a two-stepped diameter). A generally circular, relatively shallow depression 226 is defined within the outer face 206 of wheel 104 around the outer perimeter of wheel hub receiving cavity 210.

It should be understood that additional embodiments of wheel 104 may include wheel hub receiving cavities 210 which have a variety of different shapes and configurations. For example, various additional embodiments of wheel 104 may include wheel hub receiving cavities 210 which have a uniform shape and/or diameter throughout the entire length of the wheel hub receiving cavity. Various embodiments of wheel 104 may include wheel hub receiving cavities 210 which does not include one or more of outer cavity portion 210a, inner cavity portion 210b, rectangular shaped aperture 214, notches 218, and/or notches 222. For example, various embodiments of wheel 104 may include a uniform circular bore extending through the entire depth of the wheel.

Referring now to FIGS. 3A-3F, one embodiment of wheel hub 106 is illustrated in greater detail. The wheel hub 106 of various embodiments may have a variety of different shapes and configurations. The wheel hub 106 is generally shaped, configured and dimensioned to be received within wheel hub receiving cavity 210 defined in wheel 104 and engage axle 102 to retain wheel 104 on axle 102.

The illustrated embodiment of wheel hub 106 generally includes an elongated axle sleeve 300 and a main body portion 302 extending radially outwardly from the elongated axle sleeve 300. The wheel hub has an insertion end 304 and an outer end 306. An axle receiving bore 308 is defined in the insertion end 304 of the axle sleeve 300 and extends through the entire length of axle sleeve 300. At the outer end 306 of the wheel hub 106, a wheel engaging shoulder 310 extends radially outwardly from the main body portion 302. An axle receiving projection 312 extends axially outwardly from the wheel engaging shoulder 310.

Referring again to FIGS. 3A-3F, the main body portion 302 of the illustrated embodiment of wheel hub 106 is formed by a pair of sidewalls 314 and an end wall 316 that define a partially enclosed space, with an opening 318 being defined in the top and bottom of main body portion 302. Additional embodiments of wheel hub 306 include a main body portion 302 that is shaped or configured differently or is completely enclosed with no opening 318. As best illustrated in FIG. 3C, the main body portion 302 of the illustrated embodiment of wheel hub 106 has a generally rectangular shape when viewed from the insertion end 304 of wheel hub 106 and a tab 320 extends radially outwardly from both the top and bottom of end wall 316.

The main body portion 302 is generally shaped, configured and dimensioned to be received within the outer cavity portion 210a of wheel hub receiving cavity 210 defined in wheel 104, with the shape of the end wall 316 and tabs 320 coinciding generally with the shape of the rectangular shaped aperture 214 of outer cavity portion 210a and the notches 218 extending from the top and bottom of rectangular aperture 214. It should be understood, however, that the main body portions 302 of various additional embodiments may have a variety of different shapes, sizes and configurations and the shape of the main body portions 302 is not limited by the disclosure herein. For example, the main body portion may have a circular, elliptical or other shape when viewed from the insertion end 304 of wheel hub 106.

As best shown in FIGS. 3A & 3B, a pair of cantilevered arms 322 extend axially inwardly from wheel engaging shoulder 310 into the partially enclosed space defined by the main body portion 302. Each of the cantilevered arms 322 include a main portion 324 and a lug portion 326 extending radially inwardly 324 into the axle receiving bore 308 from the main portion 324. Cantilevered arms 322 stop short of end wall 316 of main body portion 302 so that cantilevered arms 322 are unobstructed from movement. The cantilevered arms 322 of the illustrated embodiment are adapted to pivot so that lug portions 326 of arms 322 are moveable radially inwardly and outwardly with respect to the axle receiving bore 308 of the wheel hub 106. Cantilevered arms 322 are generally circumferentially spaced from each other by approximately 180° so that lug portions 326 are positioned on opposite sides of axle receiving bore 308. As best illustrated in FIGS. 3D & 3E, a channel 328 is defined within the top surface of the main portion 324 of each cantilevered arm 322 and extends into the body of lug portion 326.

It should be understood that cantilevered arms 322 of various additional embodiments may have a variety of different shapes, sizes and configurations. For example, the cantilevered arms could extend from portions of the wheel hub 106 other than the wheel engaging shoulder 310 and could extend axially outward with respect to the wheel hub 106 instead of axially inward. Also, additional embodiments of the wheel hub 106 may include more than two cantilevered arms 322 or may include only one such arm. In yet further additional embodiments, cantilevered arms 322 may be replaced by another mechanism such as a spring driven plunger, reciprocating pin, or other mechanism.

Referring again to FIGS. 3A-3F, the elongated axle sleeve 300 of the illustrated embodiment of wheel hub 106 includes a wheel engaging rib 330 which extends outwardly from the axle sleeve 300 at a position axially inward from the insertion end 304 of wheel hub 106. The wheel engaging rib 330 tapers from a first end 332 outwardly to a second end 334 which has a wider diameter relative to the first end 332. In various additional embodiments the wheel engaging rib 330 may have a variety of different sizes, shapes and configurations. For example the wheel engaging rib 330 may be located at any position along the axle sleeve 300 in additional embodiments or may have a simple rectangular shape and not be tapered.

A plurality of longitudinal ribs 336 project outwardly from the axle sleeve 300 and generally extend along the length of the axle sleeve 300. A plurality of circumferential ribs 338 project outwardly from the axle sleeve 300. The circumferential ribs 338 are annular ribs which encircle the axle sleeve 300, but in various additional embodiments the circumferential ribs 338 may be non-annular and may be located at various discrete locations about the circumference of the axle sleeve 300. The longitudinal ribs 336 and circumferential ribs 338 serve to strengthen the axle sleeve 300 and main body portion 302 of the wheel hub 106. Due to the inclusion of longitudinal ribs 336 and/or circumferential ribs 338, the amount and thickness of the material used to fashion the axle sleeve 300 and main body portion 302 of the wheel hub 106 can be reduced without sacrificing the strength, rigidity or durability of the components of the wheel hub 106. The longitudinal ribs 336 and/or circumferential ribs 338 allow the axle sleeve 300 and main body portion 302 of the wheel hub 106 to have similar strength, rigidity and durability as a thicker axle sleeve 300 and main body portion 302 or an axle sleeve 300 and main body portion 302 fashioned from a stronger material. In this manner, less material or a less costly material may be used to fashion various components of the wheel hub 106 without sacrificing much or any strength, rigidity or durability. Accordingly, the longitudinal ribs 336 and circumferential ribs 338 also serve to reduce the weight of the axle sleeve 300 and main body portion 302 of the wheel hub 106 by allowing less material to be used to form the axle sleeve 300 and main body portion 302 of the wheel hub 106. Various additional embodiments of wheel hub 106 may be provided with longitudinal or circumferential ribs having a variety of shapes, sizes and configuration or may be provided without any such longitudinal or circumferential ribs.

The elongated axle sleeve 300 is generally shaped, configured and dimensioned to be received within the inner cavity portion 210b of wheel hub receiving cavity 210 defined in wheel 104, with the shape of the axle sleeve 300 and longitudinal ribs 336 extending therefrom coinciding generally with the shape of the central bore 220 and notches 222 which extend radially outward from the central bore 220. The plurality of circumferential ribs 338 projecting outwardly from the axle sleeve 300 are generally shaped, configured and dimensioned to be received within the central bore 216 of the outer cavity portion 210a of wheel 104. It should be understood, however, that the elongated axle sleeve 300 of various additional embodiments may have a variety of different shapes, sizes and configurations and the shape of the elongated axle sleeve 300 is not limited by the disclosure herein. For example, the axle sleeve 300 may have a rectangular, elliptical or other shape when viewed from the insertion end 304.

Figure 4A:
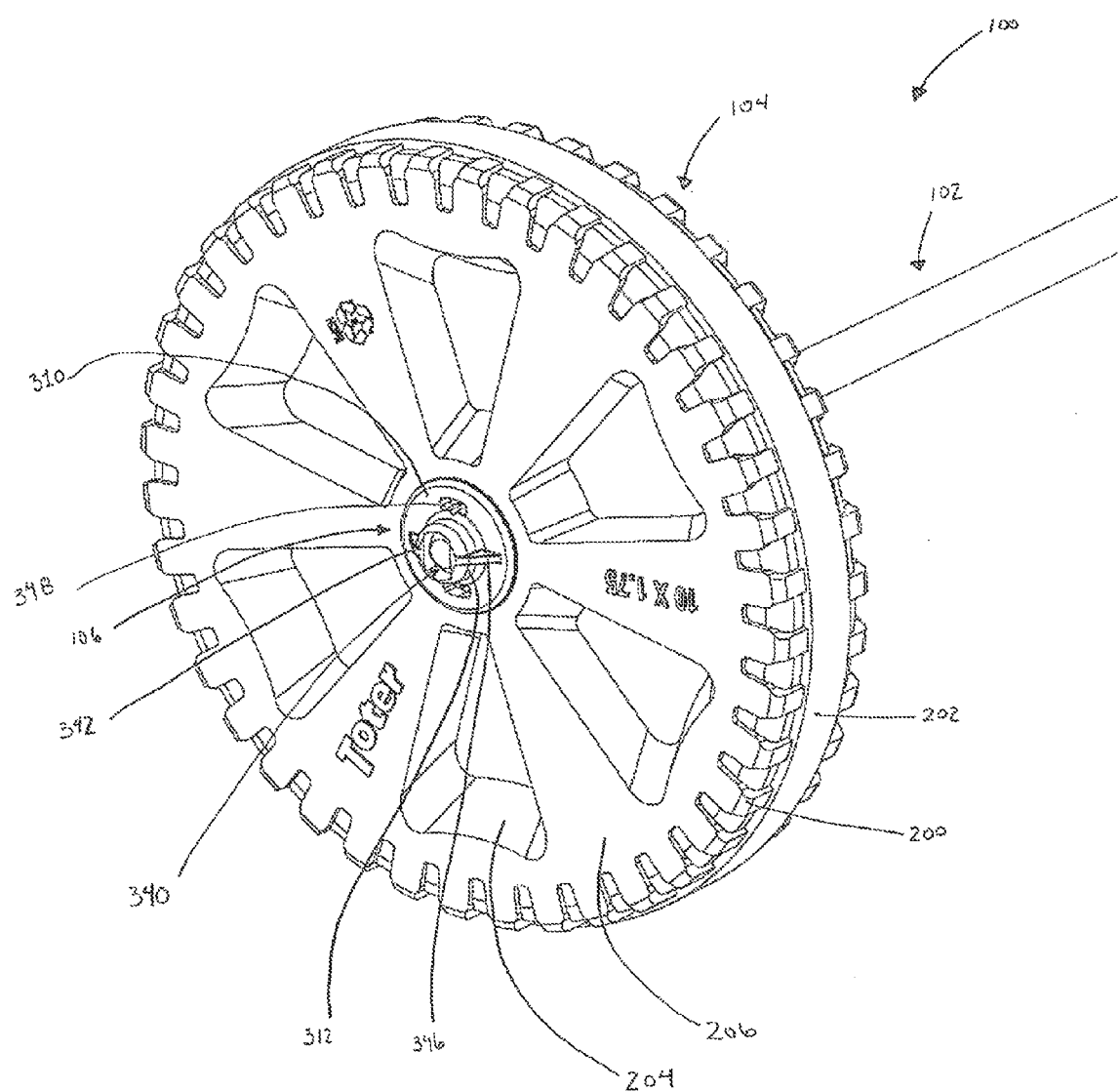
FIG. 4A shows a perspective view of the wheel assembly of FIGS. 1A-1B.

Referring again to FIGS. 3A-3F, an opening 340 (as best illustrated in FIGS. 3D & 3E) is defined through the axle receiving projection 312 of wheel hub 106, which is in communication with the axle receiving bore 308 of the axle sleeve 300. In the illustrated embodiment of wheel hub 106, opening 340 has a generally rectangular shape (as best shown in FIG. 4A) formed by semi-circular ledges 342 of axle receiving projection 312. As best shown in FIGS. 3D & 3F, an arcuate indentation 344 is defined within an inner surface 345 of each ledge 342. The indentation 344 is generally configured, shaped and dimensioned to coincide with the shape of the end 108 of axle 102. The shape, size and configuration of opening 340 and ledges 342 of axle receiving projection 312 are adapted to prevent the end 108 of axle 102 from passing through the axle receiving projection 312. As described in greater detail herein, as the wheel hub 106 is slid onto axle 102, the end 108 of axle is prevented from passing through axle receiving projection 312 by ledges 342 (as well as the engagement of lugs 326 with the notch 110 defined in axle 102). It should be understood, however, that the axle receiving projection 312 of various additional embodiments of wheel hub may have a variety of different shapes, sizes and configurations and the shape of the axle receiving projection 312 is not limited by the disclosure herein. For example, the axle receiving projection 312 does have an opening defined therein, but may be completely closed in additional embodiments. Also, in additional embodiments, the axle receiving projection 312 does not extend from the wheel engaging shoulder 310, but is flush with it.

Referring again to FIGS. 3A-3F, a transverse rib 346 extends across the surface of wheel engaging shoulder 310 to support and strengthen axle receiving projection 312. Additional embodiments may be provided without such a rib, however. Openings 348 are defined in wheel engaging shoulder 310, which permit access to the channel 328 defined within the main portion 324 and lug portion 326 of each cantilevered arm 322. However, additional embodiments may be provided without any such openings 348 or channel 328 defined within the main portion 324 and lug portion 326 of each cantilevered arm 322. It should be understood that the axle wheel engaging shoulder 310 of various additional embodiments of wheel hub may have a variety of different shapes, sizes and configurations other than the generally circular shape of the illustrated embodiment.

In the illustrated embodiment of wheel hub 106, axle sleeve 300 includes a spacer portion 350 which extends past the wheel engaging rib 330. In use, the spacer portion 350 of the wheel hub 106 serves to space the wheel 104 from the container 10 to prevent the wheel 104 from rubbing against the container 10 when the wheel 104 is mounted onto axle 102 of the container 10. The end of spacer portion 350 abuts the outer surface of wheel receiving recesses 50 of container 10 to create a space between the inner face 208 of wheel 104 and the outer surface of the wheel receiving recess 50 of container 10 when the wheel 104 is mounted on the container 10 to prevent the inner face 208 of wheel 104 from rubbing against the container 10 when the wheel 104 rotates. The dimensions of the spacer portion 350 may be modified, as desired, in various embodiments of wheel hub 106 to provide a space having a variety of different dimensions between the wheel 104 and container 10 when the wheel 104 is mounted to the container 10. Various additional embodiments of wheel hub 106 may be provided without such a spacer portion 350. Various additional embodiments of wheel hub 106 may be provided with a separate spacer that is not integrally formed with the wheel hub 106.

A wheel hub 106 according to the present invention may be formed of one or more of a variety of suitable materials. The particular material is generally selected to be compatible with the desired qualities of the wheel hub 106. For example, in various embodiments, the wheel hubs 106 may be made from one or a combination of thermoplastic or elastomeric materials, such as plastic. In various additional embodiments, the wheel hubs 106 may be made from one or a combination of metals, such as steel or aluminum.

A wheel hub 106 according to the present invention may be manufactured by one of a variety of methods of making containers that are well known in the art. The wheel hub 106 of the illustrated embodiment is formed by an injection molding process using an engineered material including nylon 66 and impact modifiers. However, good results are also obtained using rotational or blow molding processes with a variety of other thermoplastic and elastomeric materials. Accordingly, in various additional embodiments according to the instant invention, wheels 104 may also be made from one or a combination of thermoplastic or elastomeric materials, such as: polyesters, Polycarbonate (PC), polypropylene (PP), polyethylene (PE), High Density Polyethylene (HDPE), Low Density Polyethylene (LDPE), Polyvinyl Chloride (PVC), polyester terphthalate, butadiene-styrene co-polymers, polyamides, ethylene-vinyl-alcohol copolymer, polyethylene napthaphthalate, thermoplastic and thermosetting resins, polybutylene terephthalate, polyoxymethylenes, polyphenylene, polyphenylene sulfides, polyphenylene oxides, polymethylmethacrylate, polyethylene-terephthalate (PET), polyvinylidenechloride, polymethylpentene-1, nylon 6, Polyethylene Terephthalate Modified with CHDM (PETG), and mixtures thereof.

Assembly of Wheel Hub and Wheel: As described in greater detail herein, wheel hub 106 is an axle-engaging wheel hub that mounts within wheel 104 and subsequently mounts onto axle 102 without the need for any additional fasteners. In other exemplary embodiments, the wheel hub 106 may be mounted onto the axle 102 first, then the wheel hub 106 may be mounted within the wheel 104 without the need for additional fasteners. The use of such an axle-engaging wheel hub 106 generally reduces assembly time and complexity and allows the wheel hub 106 to be mounted to wheel 104 and the wheel 104/wheel hub 106 subassembly to be mounted to axle 102 without the added cost, time, or difficulty associated with the use of fasteners or fastening tools to assemble the wheel assembly 100.

Figure 4B:
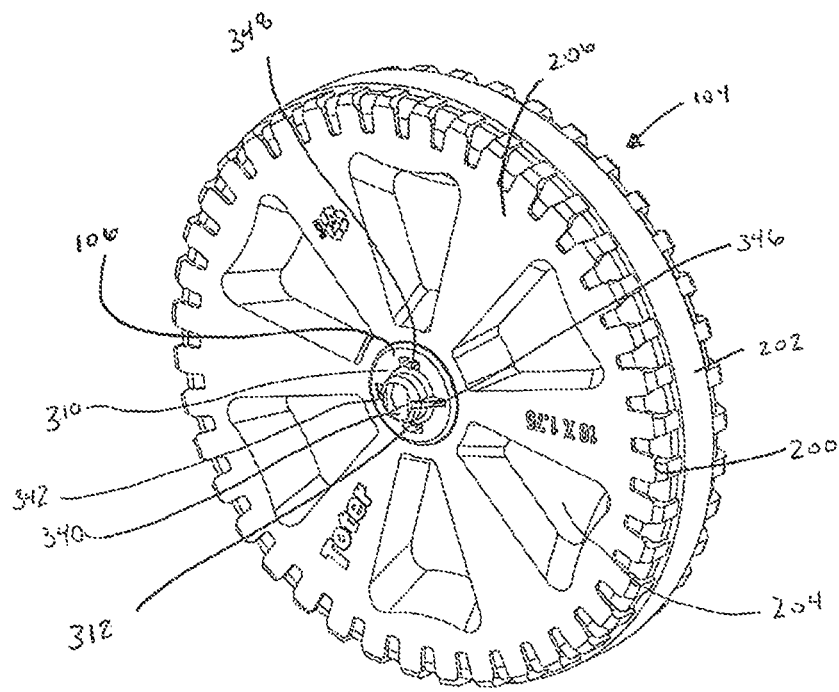
FIG. 4B shows a perspective view of an assembled wheel and wheel hub of the embodiment of the wheel assembly shown in FIG. 4A.
Figure 4C:
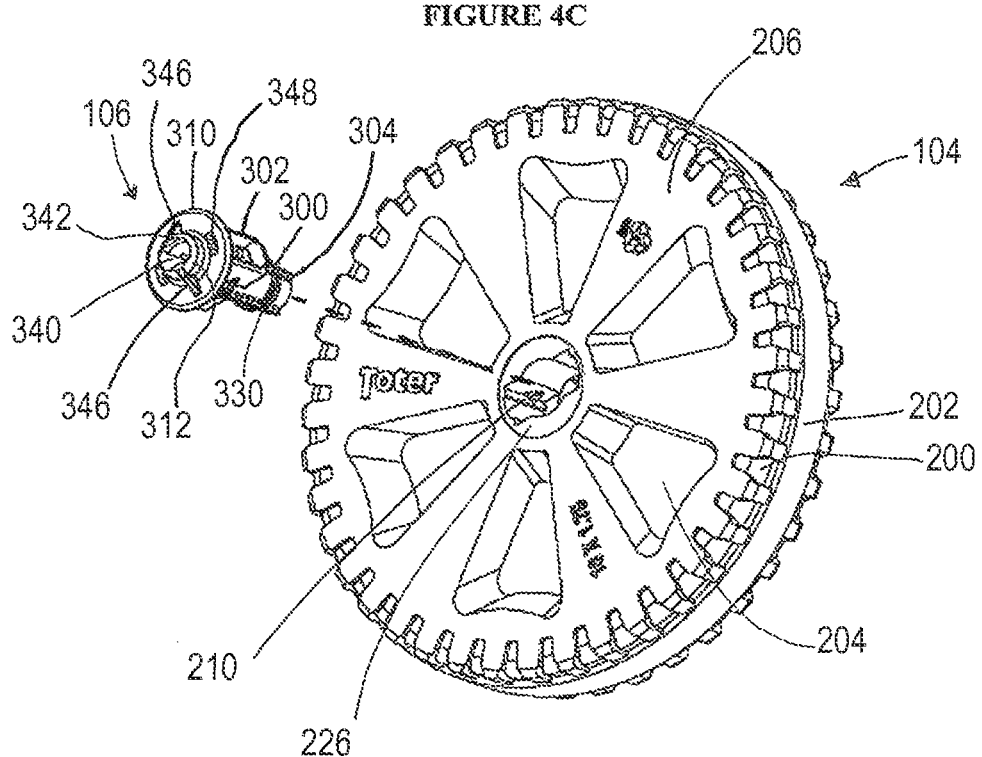
FIG. 4C shows an exploded perspective view of the wheel and wheel hub of the embodiment of the wheel assembly shown in FIG. 4A.

Referring now to FIGS. 4A-4B, one embodiment of wheel assembly 100 is shown in various stages of assembly. After the production of wheel 104 and wheel hub 106, wheel hub 106 is inserted into the wheel hub receiving cavity 210 defined through center 212 of wheel 104 (as shown by the dashed line in FIG. 4C). The wheel 104 and wheel hub 106 of the illustrated embodiment, may be assembled soon after they are molded or the wheel 104 and wheel hub 106 may be assembled at a later time.

To assemble the wheel hub 106 and wheel, the insertion end 304 of wheel hub 106 is inserted into the wheel hub receiving cavity 210 of wheel 104, with the insertion end 304 first passing through the central bore 216 of outer cavity portion 210a and then moving into the central bore 220 of inner cavity portion 210b. As the insertion end 304 of wheel hub 106 is inserted into the central bore 220 of inner cavity portion 210b, the plurality of longitudinal ribs 336 extending along the length of axle sleeve 300 are aligned with and fit within the notches 222 of central bore 220 of inner cavity portion 210b by the assembler (or assembling mechanism). The engagement of longitudinal ribs 336 of axle hub 106 with notches 222 of central bore 220 of wheel 104, serve to align and orient the wheel hub 106 and wheel 104 for proper assembly. Once the wheel hub 106 and wheel 104 have been assembled together, the ribs 336 of wheel hub 106 remain within notches 222 of wheel 104 to stabilize wheel hub 106 and prevent rotational movement of the wheel hub 106 relative to the wheel 104. As mentioned previously, additional embodiments of wheel assembly 100 may be provided without any such ribs or notches however.

Figure 4D:
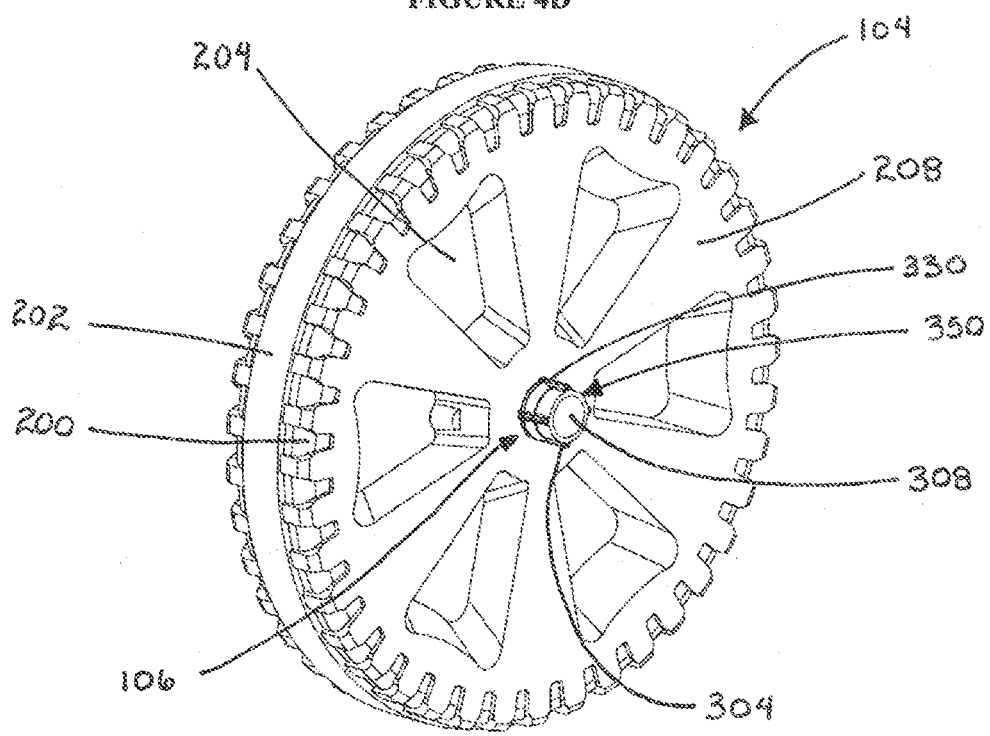
FIG. 4D shows a rear perspective view of an assembled wheel and wheel hub of the embodiment of the wheel assembly shown in FIG. 4A.
Figure 4E:
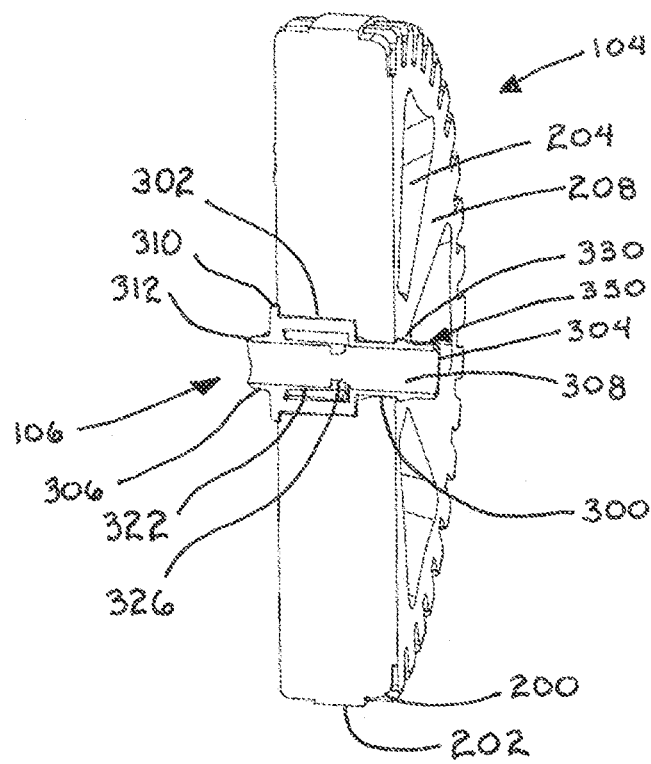
FIG. 4E shows a cross-sectional view of an assembled wheel and wheel hub of the embodiment of the wheel assembly shown in FIG. 4A.
Figure 4F:
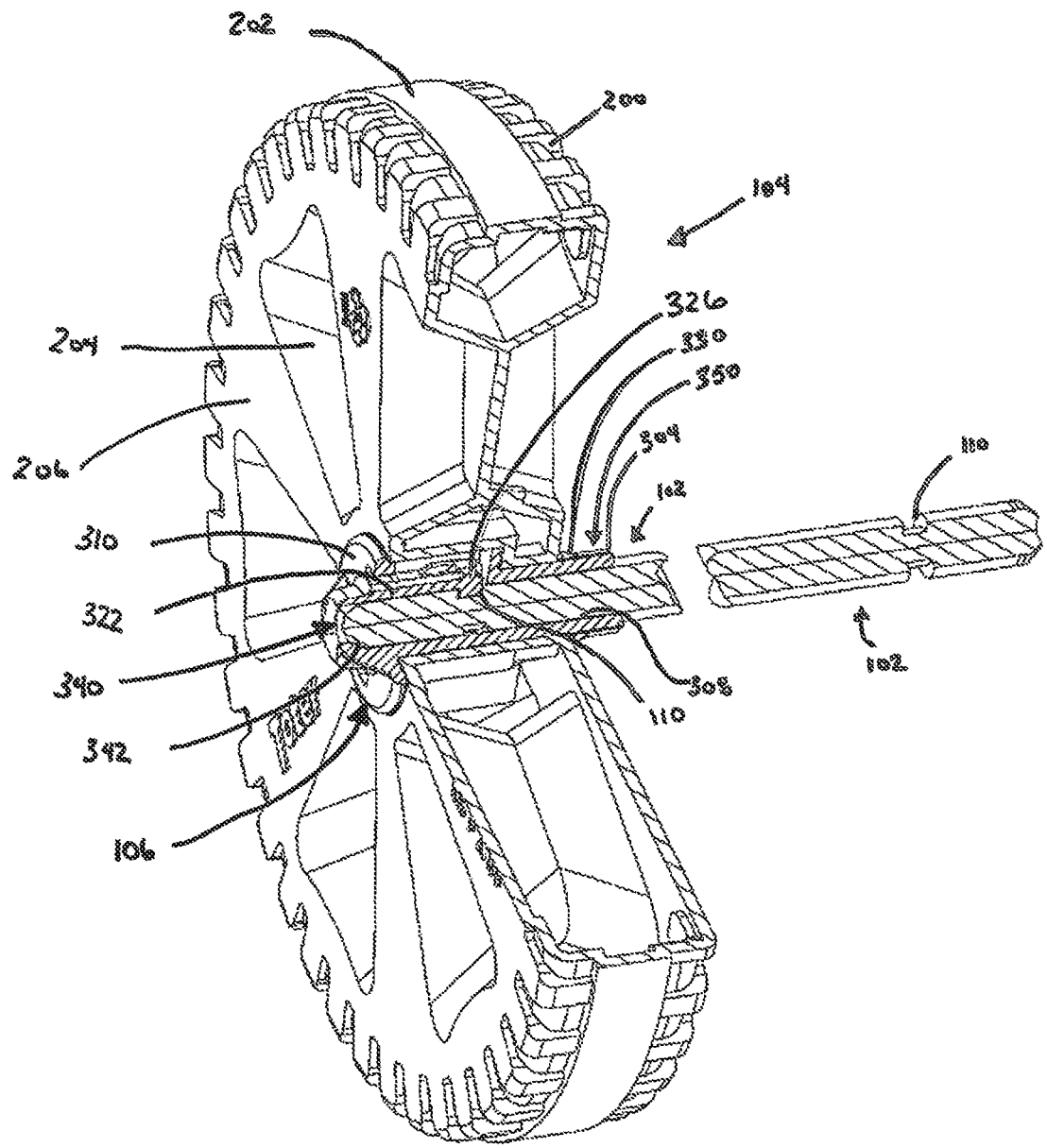
FIG. 4F shows a front perspective, cut-away view of an assembled wheel and wheel hub of the embodiment of the wheel assembly shown in FIG. 4A with a break in the axle to indicate the indeterminate length thereof.

As the insertion end 304 of wheel hub 106 is further inserted into the central bore 220 of inner cavity portion 210b, the wheel engaging rib 330 located on the elongated axle sleeve 300 of wheel hub 106 contacts the stepped portion 224 of central bore 220, the wheel engaging rib 330 and/or central bore 220 deform to permit the continued passage of the insertion end 304 of wheel hub 106 through central bore 220. The shape, dimension, configuration and material properties of wheel engaging rib 330 and central bore 220 are adapted and configured to permit the wheel engaging rib 330 and/or central bore 220 to deform a sufficient amount to permit the wheel engaging rib 330 to pass through the central bore 220 and exit the wheel hub receiving cavity 210 on the inner face 208 side of wheel 104. As best illustrated in FIGS. 4D-4F, once the wheel engaging rib 330 of the elongated axle sleeve 300 of wheel hub 106 exits the wheel hub receiving cavity 210 of wheel 104, the wheel engaging rib 330 abuts and rests against the inner face 208 side of wheel 104. The outer diameter dimension of the wheel engaging rib 330 is larger than the outer diameter dimension of central bore 220. This engagement of the wheel engaging rib 330 with the inner face 208 side of wheel 104, prevents the wheel hub 106 from being pulled back out of the wheel hub receiving cavity 210 of wheel 104 from the outer face 206 side of wheel 104.

In certain assembly methods employed with certain embodiments of wheel assembly 100, a hammer or other impact, striking, pushing, pulling, driving or urging element is used to force wheel engaging rib 330 through wheel hub receiving cavity 210. However, certain embodiments of wheel assembly, may be assembled without the use of such a device. In additional embodiments of wheel assembly 100, wheel hub 106 may not include such a wheel engaging rib 330. For example, the wheel hub 106 may be retained within wheel 104 by a cotter pin or other fastening mechanism.

As the insertion end 304 of wheel hub 106 is being inserted into central bore 220 of inner cavity portion 210b, the main body portion 302 of wheel hub 106 enters the outer cavity portion 210a of the wheel hub receiving cavity 210 of wheel 104. As the main body portion 302 of wheel hub 106 enters the outer cavity portion 210a, the sidewalls 314, end wall 316, and tabs 320 of the main body portion 302 are aligned with and fit within the rectangular shaped aperture 214 and notches 218 of outer cavity portion 210a by the assembler (or assembling mechanism). Also, the ribs 338 projecting outwardly from the axle sleeve 300 are aligned with and fit within the central bore 216 of the outer cavity portion 210a of wheel 104. The alignment of sidewalls 314, end wall 316, and tabs 320 of the main body portion 302 of axle hub 106 with the rectangular shaped aperture 214 and notches 218 of outer cavity portion 210a of wheel 104 (and the alignment of ribs 338 with central bore 216), serve to align and orient the wheel hub 106 and wheel 104 for proper assembly. Once the wheel hub 106 and wheel 104 have been assembled together, the sidewalls 314, end wall 316, and tabs 320 of the main body portion 302 of axle hub 106 remain within the rectangular shaped aperture 214 and notches 218 of outer cavity portion 210a of wheel 104 to stabilize wheel hub 106 and prevent rotational movement of the wheel hub 106 relative to the wheel 104. Additional embodiments of wheel assembly 100 may be provided without a main body portion 302 of axle hub 106 and/or outer cavity portion 210a or may be provided with a main body portion 302 and outer cavity portion 210a that do not have corresponding shapes.

As the wheel engaging rib 330 of insertion end 304 of wheel hub passes through the central bore 220 and exits the wheel hub receiving cavity 210 on the inner face 208 side of wheel 104, the wheel engaging shoulder 310 of wheel hub 106 contacts the outer face 206 of wheel 104 (as best shown in FIG. 4E). The outer diameter dimension of the wheel engaging shoulder 310 is larger than the dimension of wheel hub receiving cavity 210. This engagement of the wheel engaging shoulder 310 with the outer face 206 of wheel 104, prevents the wheel hub 106 from being pushed further through the wheel hub receiving cavity 210 of wheel 104 from the outer face 206 side of wheel 104.

In the illustrated embodiment of wheel hub 106, the distance between wheel engaging rib 330 and wheel engaging shoulder 310 of wheel hub 106 is adapted to be only slightly larger than the width of wheel 104 (as best shown in FIG. 4E), although the wheel hub 106 may be dimensioned differently in additional embodiments. In this manner, wheel hub 106 is securely mounted within wheel 104 an only able to move a minimal amount relative to wheel 104, since the wheel engaging rib 330 and wheel engaging shoulder 310 of wheel hub 106 cooperate to prevent the wheel hub 106 from moving relative to wheel 104 when the wheel hub 106 is mounted in wheel 104. In additional embodiments of wheel assembly 100, wheel hub 106 may not include such a wheel engaging shoulder 310. For example, the wheel hub 106 may be retained within wheel 104 by a cotter pin or other fastening mechanism. The shape, configuration and dimensions of the illustrated wheel engaging shoulder 310 are adapted to fit within depression 226 defined within the front face 206 of wheel 104. However, additional embodiments of wheel assembly, may be provided without such a depression.

Assembly of Wheel and Axle: After the insertion of wheel hub 106 into wheel 104, the wheel 104/wheel hub 106 subassembly is mounted onto axle 102. The wheel 104/wheel hub 106 subassembly of the illustrated embodiment, may be mounted onto an axle 102 soon after they are assembled together or the wheel 104/wheel hub 106 subassembly may be mounted onto an axle 102 at a later time. The wheel 104/wheel hub 106 subassembly may be mounted onto an axle 102 that is already mounted to container 10 or they may be first mounted onto an axle 102 which is then mounted to container 10. In yet additional embodiments, the axle 102 and wheel hub 106 may be assembled together and the wheel 104 can then be assembled with the wheel hub 106 which is already mounted on the axle 102.

Figure 5A:
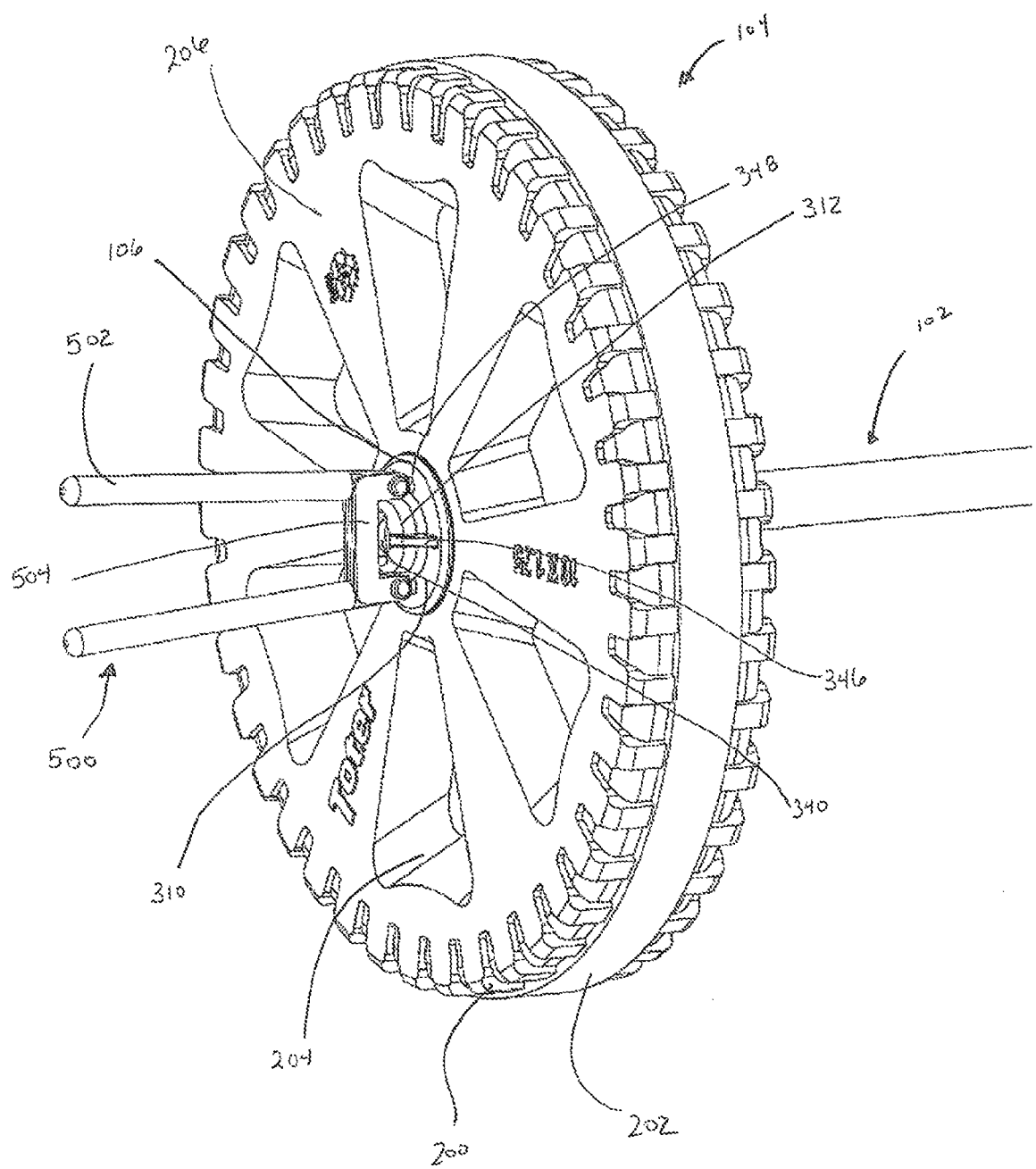
FIG. 5A shows a perspective view of one embodiment of a wheel removal device with the embodiment of the wheel assembly shown in FIGS. 1A-1B.
Figure 5B:
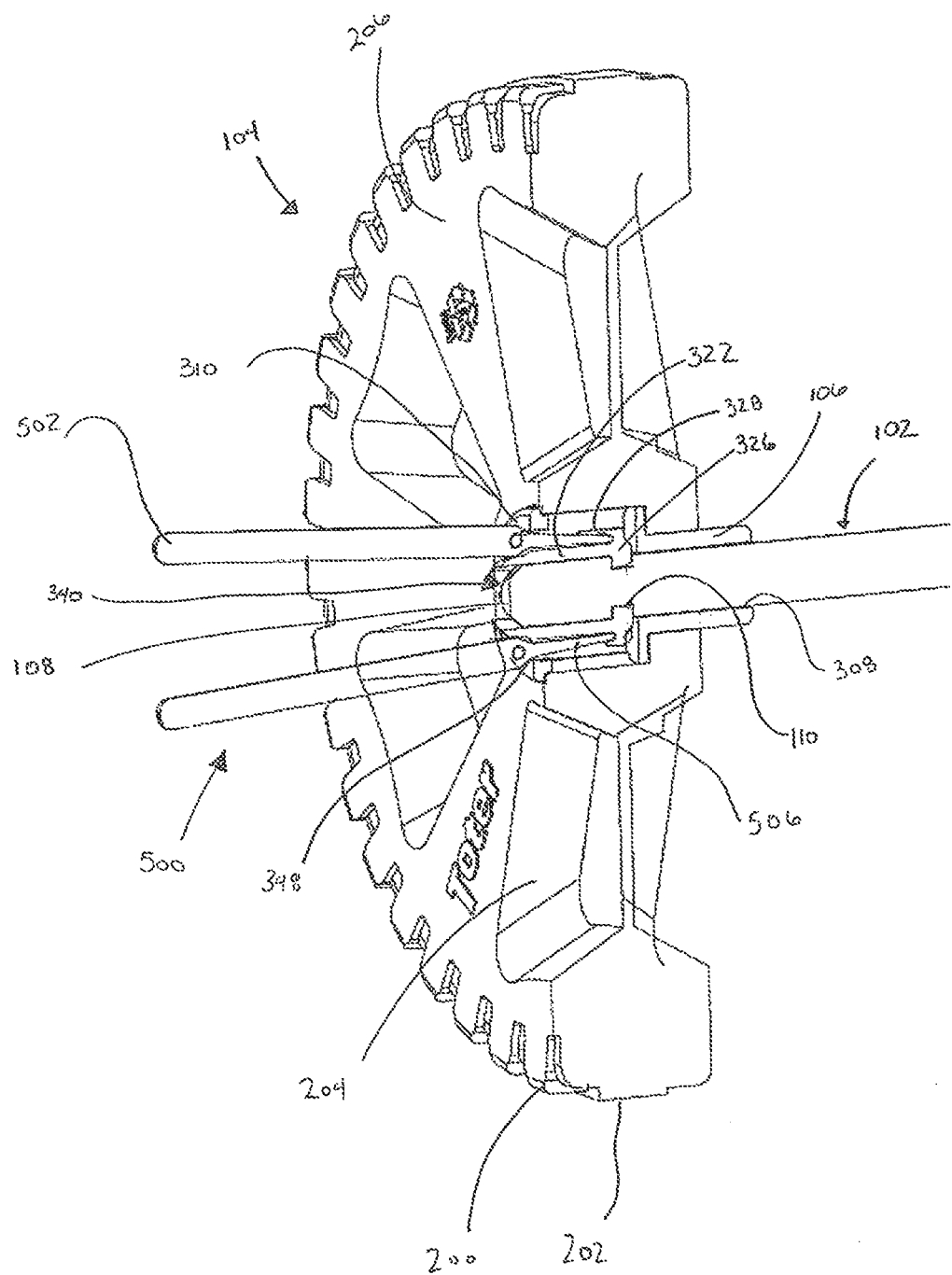
FIG. 5B shows a cross-sectional view of the wheel removal device shown in FIG. 5A with the embodiment of the wheel assembly shown in FIGS. 1A-1B.

The wheel 104/wheel hub 106 subassembly are mounted onto an axle 102 by pushing the wheel hub 106 onto the axle 102. The end 108 of axle 102 is inserted through the axle receiving bore 308 defined through the axle sleeve 300 of wheel hub 106. When the end 108 of axle 102 is inserted into the axle receiving bore 308 a sufficient amount, end 108 of axle 102 contacts lug portions 326 of cantilevered arms 322. The shape, dimension, configuration and material properties of axle 102, lug portions 326, and cantilevered arms 322 are adapted and configured to permit the lug portions 326 of cantilevered arms 322 to pivot radially outwardly relative to axle receiving bore 308 a sufficient amount to permit the end 108 of axle 102 to urge the lug portions 326 upward and be inserted further into the axle receiving bore 308 past the lug portions 326. The lug portions 326 are biased radially inwardly toward the center of the axle receiving bore 308 by the main body 324 of cantilevered arms 322 and as the axle 102 is inserted into the axle receiving bore 308 to the point where the notch 110 defined within the axle 102 is below the lug portions 326 of arms 322, the lug portions 326 are urged radially inwardly relative to axle receiving bore 308 into notch 110 (as best shown in FIG. 5B).

The engagement of lug portions 326 of arms 322 of wheel hub 106 with notch 110 of axle 102, secures wheel hub 106 onto axle 102. When the axle 102 is inserted into the axle receiving bore 308 to the point where the lug portions 326 of arms 322 engage with the notch 110 defined within the axle 102, the end 108 of axle 102 extends into the axle receiving projection 312 of wheel hub 106. Ledges 342 of the axle receiving projection 312 serve as a stop to prevent the axle 102 from extending completely through the wheel hub 106 (as best shown in FIG. 4F). In additional embodiments, additional elements may be used to prevent the axle from extending through the wheel hub 106. The opening 340 defined through axle receiving projection 312 permits visibility of axle 102 within wheel hub 106 to ensure the proper mounting of wheel hub 106 onto axle 102. Additional embodiments of wheel hub 106 may include a closed axle receiving projection 312. As mentioned previously, indentation 344 defined within ledges 342 is generally configured, shaped and dimensioned to coincide with the shape of the end 108 of axle 102. It should be understood, that additional embodiments of wheel assembly 100, may include wheel hubs 106 that do not include cantilevered arms 322 or an axle receiving projection 312.

The engagement of lug portions 326 of arms 322 of wheel hub 106 with notch 110 of axle 102 and the abutment of the end 108 of axle 102 against the ledges 342 of the axle receiving projection 312 of wheel hub 106 prevents the axle 102 from being withdrawn from axle receiving bore 308 of wheel hub 106 or inserted further into the axle receiving bore 308. In turn, the engagement of the wheel hub 106 with wheel 104 serves to mount wheel 104 onto axle 102. In the illustrated embodiment of wheel assembly 100, the shape, configuration and dimension of the axle 102, wheel 104 and wheel hub 106 are configured so that the end 108 of axle 102 projects past outer face 208 of wheel 104 when the wheel hub 106 is mounted onto the axle 102. The extending of the axle 102 past the outer face 208 of wheel 104, increases the performance of wheel 104 with respect to rotational loads or torque placed upon or exerted on the wheel 104. However, additional embodiments of wheel assembly 100 may be adapted and configured so the end 108 of axle 102 does not project past the outer face 208 of wheel 104 when the wheel hub 106 is mounted onto the axle 102

Removal of Wheel from Axle: Referring now to FIG. 5A-5B, a removal tool 500 is illustrated for use in removing wheel 104 from axle 102. Once wheel 104 is properly mounted onto axle 102, the wheel 104 cannot be removed from axle 102 without damaging one or more of wheel 104, wheel hub 106 or axle 102 unless the lugs 326 of arms 322 of wheel hub 106 are disengaged from notch 110 of axle 102. Removal tool 500 includes a pair of handles 502 pivotally mounted to a central body 504. As shown in FIG. 5B, removal tool 500 further includes a pair of extensions 506 which are operatively connected to handles 502. Removal tool 500 is configured so that a squeezing together of handles 502 will urge extensions 506 away from one another. To remove a wheel 104 of the wheel assembly 100 of the illustrated embodiment from an axle 102, the extensions 506 are inserted through openings 348 defined through wheel engaging shoulder 310 of wheel hub 106. Extensions 506 of removal tool 500 are inserted into the channel 328 defined within the top surface of the main portion 324 of each cantilevered arms 322 which extends into the body of lug portions 326. Once the extensions 506 of removal tool 500 are positioned to extend within the lug portions 326, handles 502 are squeezed together, thus urging extensions 506 apart and, in turn, urging lug portions 326 radially outward with respect to axle receiving bore 308 of wheel hub 106. Once the lug portions 326 have been urged radially outwardly a sufficient amount, axle 102 is able to be retracted from axle receiving bore 308 of wheel hub 106, thus removing wheel 104 from axle 102.

FIGS. 6A-6B show one exemplary embodiment of a wheeled container 10 which includes another embodiment of a wheel assembly 600. The description of container 10 included herein with respect to wheel assembly 100 is applicable to container 10 used with wheel assembly 600.

Wheel Assembly Including Wheel Hub Adapted for Use with a Fastener: The illustrated embodiment of wheeled container 10 of FIGS. 6A-6B, includes a wheel assembly 600. The wheel assembly 600 of the illustrated embodiment generally includes an axle 102, a pair of wheels 104, and a pair of wheel hubs 606. The description of axle 102 and wheels 104 included herein with respect to wheel assembly 100 is applicable to wheel assembly 600. However, other axles and wheels may be used. Wheel assembly 600 is mounted to container 10 by the axle 102, which extends through the axle bore 70 defined through wheel assembly mounting portions 60 of container 10. A wheel hub 606 is mounted within each wheel 104. As described in greater detail herein, each wheel hub 606 is adapted for use with fastener 608 which mounts wheel 104 on axle 102.

While the wheel assembly 600 of the illustrated embodiment includes one axle and a pair of wheels and wheel hubs, additional embodiments of wheel assembly 600 may include different numbers of axles, wheels or wheel hubs. For example, various additional embodiments may include two axles and a pair of wheels, with each wheel being mounted to the container with its own axle. In addition, various additional embodiments of the wheel assembly may include different numbers of wheels, such as one wheel, three wheels, four wheels, etc., which are mounted to one or more axles by one or more wheel hubs.

Referring now to FIGS. 7A-7F, one embodiment of wheel hub 606 is illustrated in greater detail. The wheel hub 606 of various embodiments may have a variety of different shapes and configurations. The wheel hub 606 is generally shaped, configured and dimensioned to be received within wheel hub receiving cavity 210 defined in wheel 104. As described in more detail herein, the wheel hub 606 is adapted for use with fastener 608 which engages axle 102 to retain wheel 104 on axle 102.

The illustrated embodiment of wheel hub 606 generally includes an elongated axle sleeve 700 and a main body portion 702 extending radially outwardly from the elongated axle sleeve 700. The wheel hub has an insertion end 704 and an outer end 706. An axle receiving bore 708 is defined in the insertion end 704 of the axle sleeve 700 and extends through the entire length of axle sleeve 700.

Figure 7A:
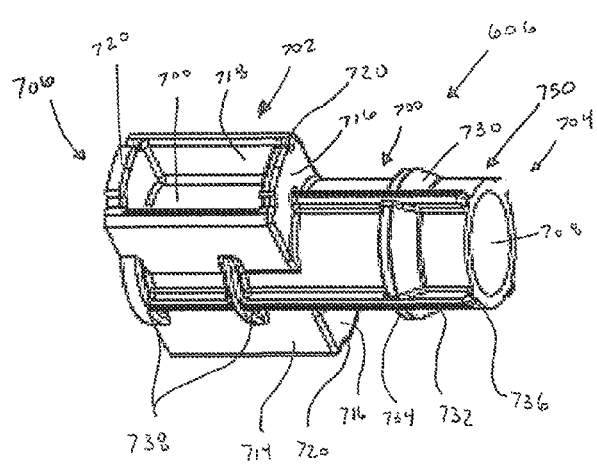
FIG. 7A shows a perspective view of one embodiment of a wheel hub of the wheel assembly shown in FIGS. 6A-6B.
Figure 7D:
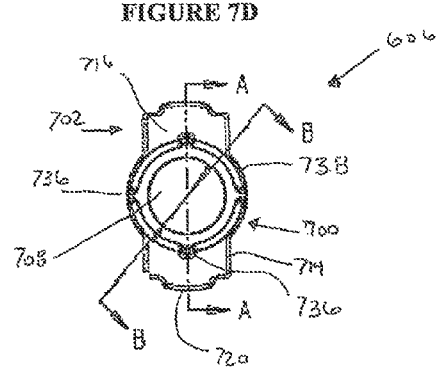
FIG. 7D shows an end view of the embodiment of the wheel hub in FIG. 7A.
Figure 7B:
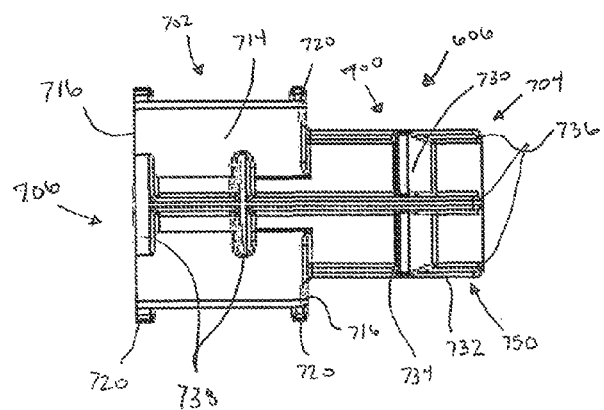
FIG. 7B shows a side view of the embodiment of the wheel hub in FIG. 7A.
Figure 7E:
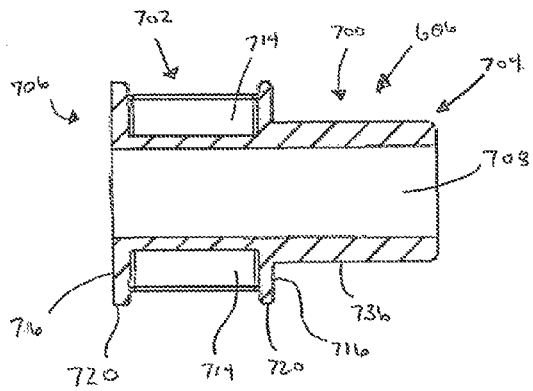
FIG. 7E shows a cross-sectional view of the embodiment of the wheel hub in FIG. 7A taken along plane A-A in FIG. 7D.
Figure 7C:
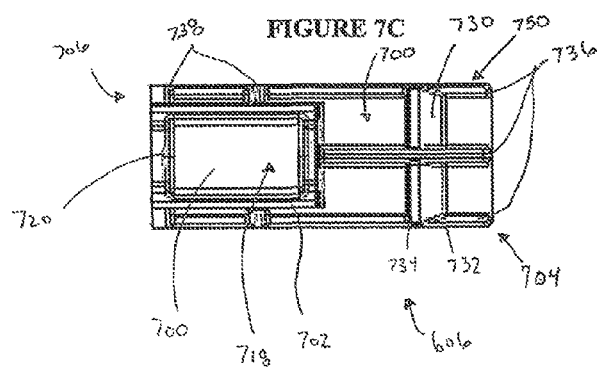
FIG. 7C shows a top view of the embodiment of the wheel hub in FIG. 7A.
Figure 7F:
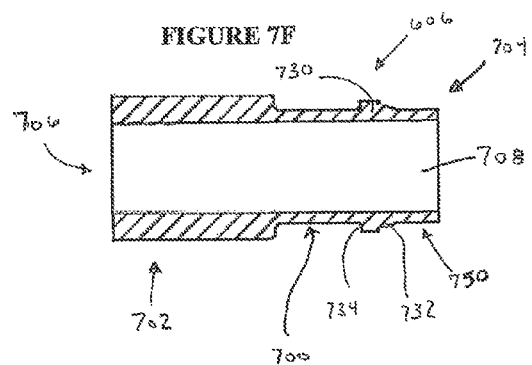
FIG. 7F shows a cross-sectional view of the embodiment of the wheel hub in FIG. 7A taken along plane B-B in FIG. 7D.

The main body portion 702 of the illustrated embodiment of wheel hub 606 is formed by a pair of sidewalls 714 and a pair of end walls 716 that define a partially enclosed space, with an opening 718 being defined in the top and bottom of main body portion 702. Additional embodiments of wheel hub 606 include a main body portion 702 that is shaped or configured differently or is completely enclosed with no opening 718. As best illustrated in FIG. 7C, the main body portion 702 of the illustrated embodiment of wheel hub 606 has a generally rectangular shape when viewed from the insertion end 704 of wheel hub 606 and a tab 720 extends radially outwardly from both the top and bottom of each end wall 716.

The main body portion 702 is generally shaped, configured and dimensioned to be received within the outer cavity portion 210a of wheel hub receiving cavity 210 defined in wheel 104, with the shape of the end walls 716 and tabs 720 coinciding generally with the shape of the rectangular shaped aperture 214 of outer cavity portion 210a and the notches 218 extending from the top and bottom of rectangular aperture 214. It should be understood, however, that the main body portions 702 of various additional embodiments may have a variety of different shapes, sizes and configurations and the shape of the main body portions 702 is not limited by the disclosure herein. For example, the main body portion may have a circular, elliptical or other shape when viewed from the insertion end 704 of wheel hub 606.

Referring again to FIGS. 7A-7D, the elongated axle sleeve 700 of the illustrated embodiment of wheel hub 606 includes a wheel engaging rib 730 which extends outwardly from the axle sleeve 700 at a position axially inward from the insertion end 704 of wheel hub 606. The wheel engaging rib 730 tapers from a first end 732 outwardly to a second end 734 which has a wider diameter relative to the first end 732. In various additional embodiments the wheel engaging rib 730 may have a variety of different sizes, shapes and configurations. For example the wheel engaging rib 730 may be located at any position along the axle sleeve 700 in additional embodiments or may have a simple rectangular shape and not be tapered.

A plurality of longitudinal ribs 736 project outwardly from the axle sleeve 700 and generally extend the length of the axle sleeve 700. A plurality of circumferential ribs 738 project outwardly from the axle sleeve 700. The circumferential ribs 738 are annular ribs which encircle the axle sleeve 700, but in various additional embodiments the circumferential ribs 738 may be non-annular and may be located at various discrete locations about the circumference of the axle sleeve 700. The longitudinal ribs 736 and/or circumferential ribs 738 serve to strengthen the axle sleeve 700 and main body portion 702 of the wheel hub 606. Due to the inclusion of longitudinal ribs 736 and/or circumferential ribs 738, the amount and thickness of the material used to fashion the axle sleeve 700 and main body portion 702 of the wheel hub 606 can be reduced without sacrificing the strength, rigidity or durability of the components of the wheel hub 606. The longitudinal ribs 736 and/or circumferential ribs 738 allow the axle sleeve 700 and main body portion 702 of the wheel hub 606 to have similar strength, rigidity and durability as a thicker axle sleeve 700 and main body portion 702 or an axle sleeve 700 and main body portion 702 fashioned from a stronger material. In this manner, less material or a less costly material may be used to fashion various components of the wheel hub 606 without sacrificing much or any strength, rigidity or durability. Accordingly, the longitudinal ribs 736 and circumferential ribs 738 also serve to reduce the weight of the axle sleeve 700 and main body portion 702 of the wheel hub 606 by allowing less material to be used to form the axle sleeve 700 and main body portion 702 of the wheel hub 606. Various additional embodiments of wheel hub 606 may be provided with longitudinal or circumferential ribs having a variety of shapes, sizes and configuration or may be provided without any such longitudinal or circumferential ribs.

The elongated axle sleeve 700 is generally shaped, configured and dimensioned to be received within the inner cavity portion 210b of wheel hub receiving cavity 210 defined in wheel 104, with the shape of the axle sleeve 700 and longitudinal ribs 736 extending therefrom coinciding generally with the shape of the central bore 220 and notches 222 which extend radially outward from the central bore 220. The plurality of circumferential ribs 738 projecting outwardly from the axle sleeve 700 are generally shaped, configured and dimensioned to be received within the central bore 216 of the outer cavity portion 210a of wheel 104. It should be understood, however, that the elongated axle sleeve 700 of various additional embodiments may have a variety of different shapes, sizes and configurations and the shape of the elongated axle sleeve 700 is not limited by the disclosure herein. For example, the axle sleeve 700 may have a rectangular, elliptical or other shape when viewed from the insertion end 704.

In the illustrated embodiment of wheel hub 606, axle sleeve 700 includes a spacer portion 750 which extends past the wheel engaging rib 730. In use, the spacer portion 750 of the wheel hub 106 serves to space the wheel 104 from the container 10 to prevent the wheel 104 from rubbing against the container 10 when the wheel 104 is mounted onto axle 102 of the container 10. The end of spacer portion 750 abuts the outer surface of wheel receiving recesses 50 of container 10 to create a space between the inner face 208 of wheel 104 and the outer surface of the wheel receiving recess 50 of container 10 when the wheel 104 is mounted on the container 10 to prevent the inner face 208 of wheel 104 from rubbing against the container 10 when the wheel 104 rotates. The dimensions of the spacer portion 750 may be modified, as desired, in various embodiments of wheel hub 606 to provide a space having a variety of different dimensions between the wheel 104 and container 10 when the wheel 104 is mounted to the container 10. Various additional embodiments of wheel hub 606 may be provided without such a spacer portion 750. Various additional embodiments of wheel hub 606 may be provided with a separate spacer that is not integrally formed with the wheel hub 606.

A wheel hub 606 according to the present invention may be formed of one or more of a variety of suitable materials. The particular material is generally selected to be compatible with the desired qualities of the wheel hub 606. For example, in various embodiments, the wheel hubs 606 may be made from one or a combination of thermoplastic or elastomeric materials, such as plastic. In various additional embodiments, the wheel hubs 606 may be made from one or a combination of metals, such as steel or aluminum.

A wheel hub 606 according to the present invention may be manufactured by one of a variety of methods of making containers that are well known in the art. The wheel hub 606 of the illustrated embodiment is formed by an injection molding process using a High Density Polyethylene (HDPE). However, good results are also obtained using rotational or blow molding processes with a variety of other thermoplastic and elastomeric materials. Accordingly, in various additional embodiments according to the instant invention, wheels 104 may also be made from one or a combination of thermoplastic or elastomeric materials, such as: polyesters, Polycarbonate (PC), polypropylene (PP), polyethylene (PE), Low Density Polyethylene (LDPE), Polyvinyl Chloride (PVC), polyester terphthalate, butadiene-styrene co-polymers, polyamides, ethylene-vinyl-alcohol copolymer, polyethylene napthaphthalate, thermoplastic and thermosetting resins, polybutylene terephthalate, polyoxymethylenes, polyphenylene, polyphenylene sulfides, polyphenylene oxides, polymethylmethacrylate, polyethylene-terephthalate (PET), polyvinylidenechloride, polymethylpentene-1, nylon 6, nylon 66, Polyethylene Terephthalate Modified with CHDM (PETG), and mixtures thereof.

Figure 8B:
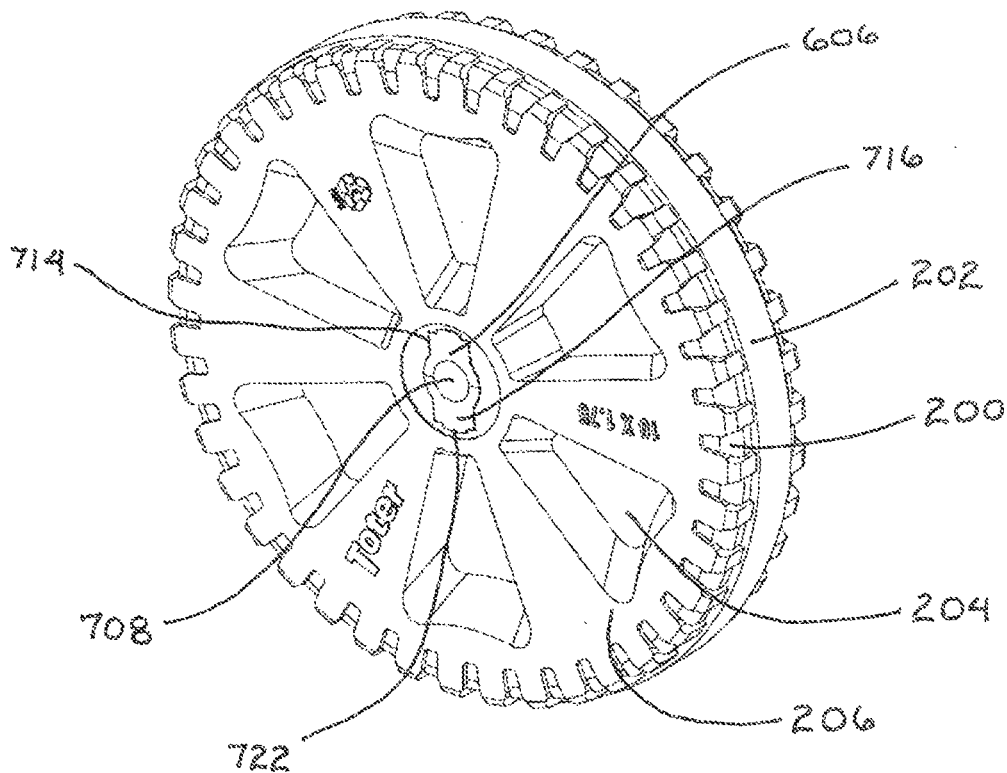
FIG. 8B shows a perspective view of an assembled wheel and wheel hub of the embodiment of the wheel assembly shown in FIG. 8A.
Figure 8C:
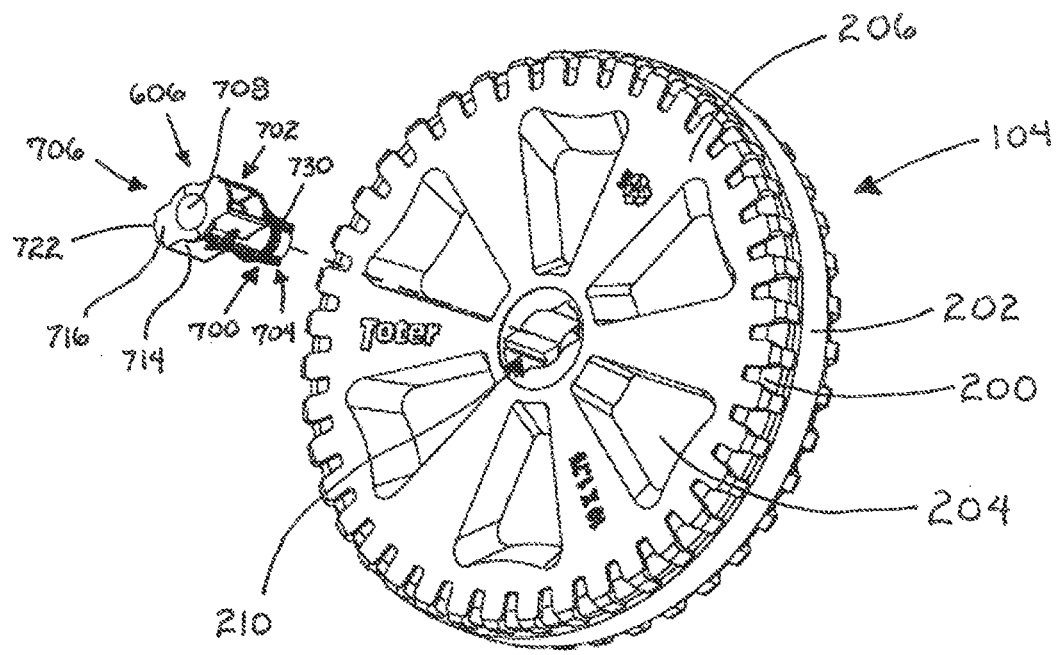
FIG. 8C shows an exploded perspective view of the wheel and wheel hub of the embodiment of the wheel assembly shown in FIG. 8A.

Assembly of Wheel Hub Adapted for Use with Fastener and Wheel: As described in greater detail herein, wheel hub 606 mounts within wheel 104. As described in greater detail herein, wheel hub 606 is adapted for use with fastener 608 which mounts wheel 104 on axle 102. Referring now to FIGS. 8A-8B, one embodiment of wheel assembly 600 is shown in various stages of assembly. After the production of wheel 104 and wheel hub 606, wheel hub 606 is inserted into the wheel hub receiving cavity 210 defined through center 212 of wheel 104 (as shown by the dashed line in FIG. 8C). The wheel 104 and wheel hub 606 of the illustrated embodiment, may be assembled soon after they are molded or the wheel 104 and wheel hub 606 may be assembled at a later time.

To assemble the wheel hub 606 and wheel, the insertion end 704 of wheel hub 606 is inserted into the wheel hub receiving cavity 210 of wheel 104, with the insertion end 704 first passing through the central bore 216 of outer cavity portion 210a and then moving into the central bore 220 of inner cavity portion 210b. As the insertion end 704 of wheel hub 606 is inserted into the central bore 220 of inner cavity portion 210b, the plurality of longitudinal ribs 736 extending along the length of axle sleeve 700 are aligned with and fit within the notches 222 of central bore 220 of inner cavity portion 210b by the assembler (or assembling mechanism). The engagement of longitudinal ribs 736 of axle hub 606 with notches 222 of central bore 220 of wheel 104, serve to align and orient the wheel hub 606 and wheel 104 for proper assembly. Once the wheel hub 606 and wheel 104 have been assembled together, the ribs 736 of wheel hub 606 remain within notches 222 of wheel 104 to stabilize wheel hub 606 and prevent rotational movement of the wheel hub 606 relative to the wheel 104. As mentioned previously, additional embodiments of wheel assembly 600 may be provided without any such ribs or notches however.

Figure 8D:
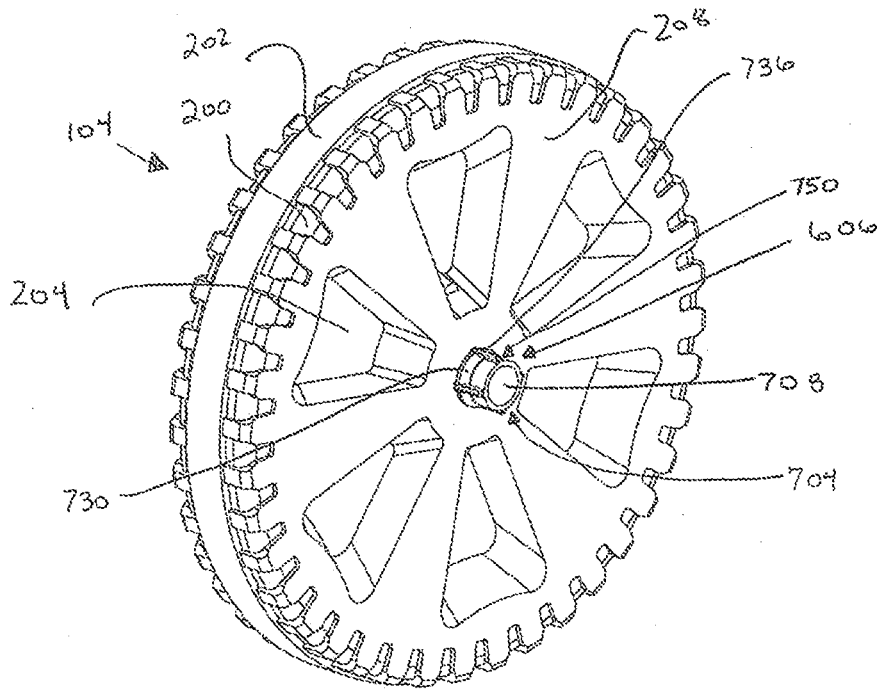
FIG. 8D shows a rear perspective view of an assembled wheel and wheel hub of the embodiment of the wheel assembly shown in FIG. 8A.
Figure 8E:
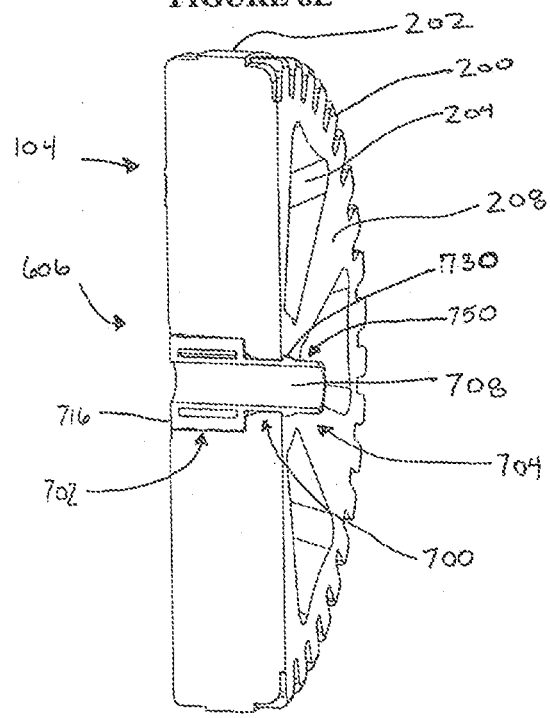
FIG. 8E shows a cross-sectional view of an assembled wheel and wheel hub of the embodiment of the wheel assembly shown in FIG. 8A.
Figure 8F:
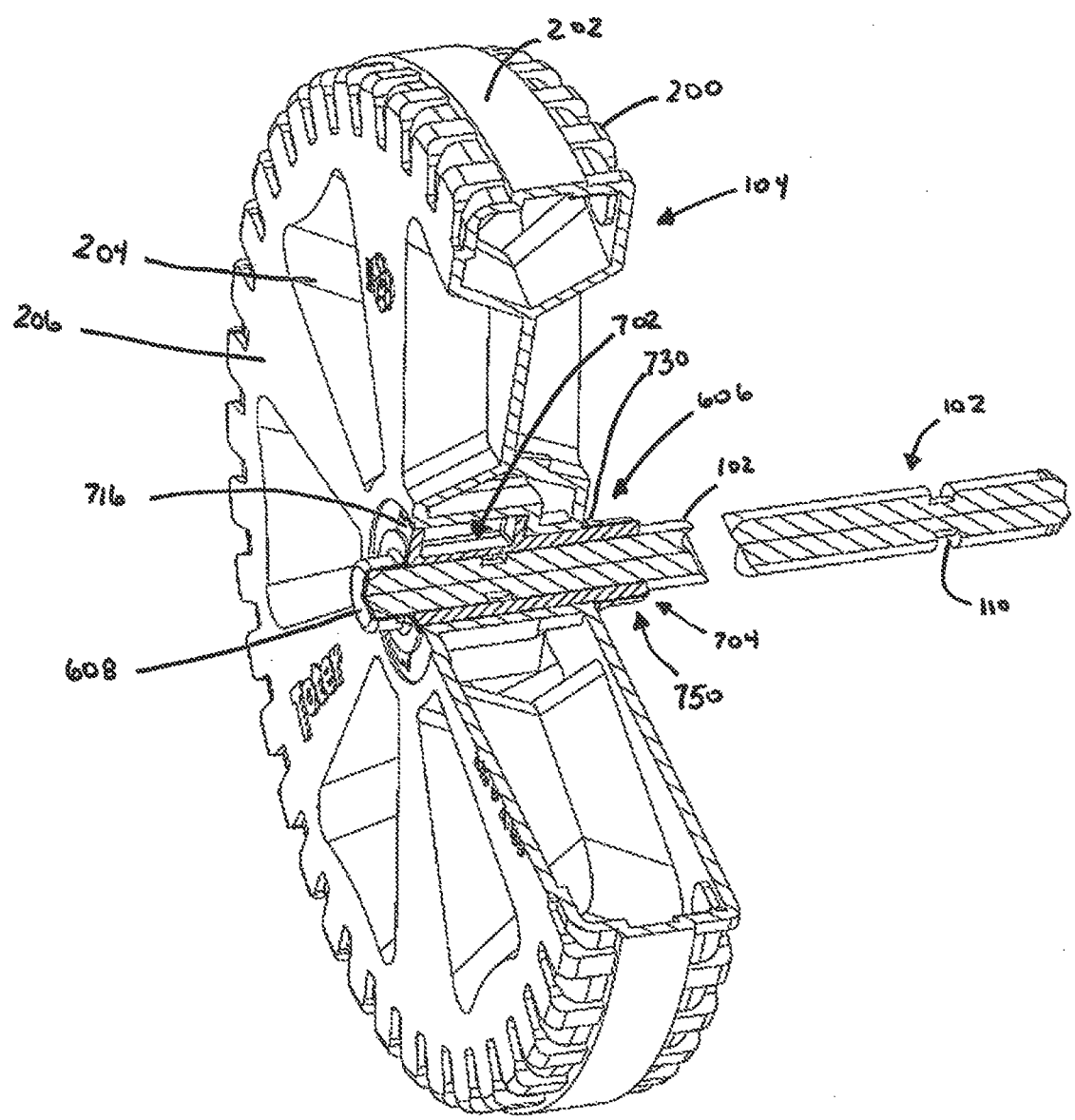
FIG. 8F shows a front perspective, cut-away view of an assembled wheel and wheel hub of the embodiment of the wheel assembly shown in FIG. 8A with a break in the axle to indicate the indeterminate length thereof.

As the insertion end 704 of wheel hub 606 is further inserted into the central bore 220 of inner cavity portion 210b, the wheel engaging rib 730 located on the elongated axle sleeve 700 of wheel hub 606 contacts the stepped portion 224 of central bore 220, the wheel engaging rib 730 and/or central bore 220 deform to permit the continued passage of the insertion end 704 of wheel hub 606 through central bore 220. The shape, dimension, configuration and material properties of wheel engaging rib 730 and central bore 220 are adapted and configured to permit the wheel engaging rib 730 and/or central bore 220 to deform a sufficient amount to permit the wheel engaging rib 730 to pass through the central bore 220 and exit the wheel hub receiving cavity 210 on the inner face 208 side of wheel 104. As best illustrated in FIGS. 8D-8F, once the wheel engaging rib 730 of the elongated axle sleeve 700 of wheel hub 606 exits the wheel hub receiving cavity 210 of wheel 104, the wheel engaging rib 730 abuts and rests against the inner face 208 side of wheel 104. The outer diameter dimension of the wheel engaging rib 730 is larger than the outer diameter dimension of central bore 220. This engagement of the wheel engaging rib 730 with the inner face 208 side of wheel 104, prevents the wheel hub 606 from being pulled back out of the wheel hub receiving cavity 210 of wheel 104 from the outer face 206 side of wheel 104. The abutment of the inner end wall 714 of the main body portion 702 of wheel hub 606 against the bottom wall of aperture 214 of wheel 104 when wheel hub 606 is inserted into wheel hub receiving cavity 210 of wheel 104, prevents the wheel hub 606 from being pushed further through the wheel hub receiving cavity 210 of wheel 104 from the outer face 206 side of wheel 104.

In certain assembly methods employed with certain embodiments of wheel assembly 600, a hammer or other impact, striking, pushing, pulling, driving or urging element is used to force wheel engaging rib 730 through wheel hub receiving cavity 210. However, certain embodiments of wheel assembly, may be assembled without the use of such a device. In additional embodiments of wheel assembly 600, wheel hub 606 may not include such a wheel engaging rib 730. For example, the wheel hub 106 may be retained within wheel 104 by a cotter pin or other fastening mechanism.

As the insertion end 704 of wheel hub 606 is being inserted into central bore 220 of inner cavity portion 210*b*, the main body portion 702 of wheel hub 606 enters the outer cavity portion 210*a* of the wheel hub receiving cavity 210 of wheel 104. As the main body portion 702 of wheel hub 606 enters the outer cavity portion 210*a*, the sidewalls 714, end wall 716, and tabs 720 of the main body portion 702 are aligned with and fit within the rectangular shaped aperture 214 and notches 218 of outer cavity portion 210*a* by the assembler (or assembling mechanism). Also, the ribs 738 projecting outwardly from the axle sleeve 700 are aligned with and fit within the central bore 216 of the outer cavity portion 210*a* of wheel 104. The alignment of sidewalls 714, end wall 716, and tabs 720 of the main body portion 702 of axle hub 606 with the rectangular shaped aperture 214 and notches 218 of outer cavity portion 210*a* of wheel 104 (and the alignment of ribs 738 with central bore 216), serve to align and orient the wheel hub 606 and wheel 104 for proper assembly. Once the wheel hub 606 and wheel 104 have been assembled together, the sidewalls 714, end wall 716, and tabs 720 of the main body portion 702 of axle hub 606 remain within the rectangular shaped aperture 214 and notches 218 of outer cavity portion 210*a* of wheel 104 to stabilize wheel hub 606 and prevent rotational movement of the wheel hub 606 relative to the wheel 104. Additional embodiments of wheel assembly 600 may be provided without a main body portion 702 of axle hub 606 and/or outer cavity portion 210*a* or may be provided with a main body portion 702 and outer cavity portion 210*a* that do not have corresponding shapes.

In the illustrated embodiment of wheel hub 606, the distance between wheel engaging rib 730 and outermost end wall 716 located at end 706 is adapted so that wheel hub outermost end wall 716 of wheel hub 606 is flush with outer face 208 of wheel 104 when wheel hub 606 is mounted within wheel 104. However additional embodiments of wheel assembly 600 may include a wheel hub 606 that either extends outward from outer face 208 of wheel 104 or is recessed within wheel hub receiving cavity 210.

Assembly of Wheel and Axle: After the insertion of wheel hub 606 into wheel 104, the wheel 104/wheel hub 606 subassembly is mounted onto axle 102 by use of fastener 608. The wheel 104/wheel hub 606 subassembly of the illustrated embodiment, may be mounted onto an axle 102 soon after they are assembled together or the wheel 104/wheel hub 106 subassembly may be mounted onto an axle 102 at a later time. The wheel 104/wheel hub 106 subassembly may be mounted onto an axle 102 that is already mounted to container 10 or they may be first mounted onto an axle 102 which is then mounted to container 10. In yet additional embodiments, the axle 102 and wheel hub 606 may be assembled together and the wheel 104 can then be assembled with the wheel hub 606 which is already mounted on the axle 102.

The wheel 104/wheel hub 606 subassembly are mounted onto an axle 102 by inserting axle 102 through the wheel hub 606 and affixing fastener 608 to the axle 102. The end 108 of axle 102 is inserted through the axle receiving bore 708 defined through the axle sleeve 700 of wheel hub 606. When the end 108 of axle 102 is inserted through the wheel hub and projects outwardly from the axle receiving bore 708 on the outer end 706 of wheel hub 606, fastener 608 is attached to axle 102.

As best illustrated in FIG. 8A, fastener 608 is a generally cap shaped fastener having a cup shaped portion 800 extending outwardly from a generally planar rim 802. Cup shaped portion 800 is adapted to fit over end 108 of axle. Fastener 608 includes at least one tab 804 extending from rim 802. Tab 804 engages notch 110 defined in axle 102 to retain fastener 608 onto axle 102. Depending upon the type of fastener being utilized, additional embodiments of wheel assembly 600 may include an axle 102 that does not include a notch 110. Rim 802 abuts wheel hub 606 and/or outer surface 208 of wheel 104 to retain wheel hub 606 and wheel 104 onto axle. While the illustrated embodiment of wheel assembly 600 includes a cap shaped fastener, various additional types of fasteners may be utilized. For example, an annular shaped fastener, a clamp, cotter pin, hairpin, threaded axle with corresponding threaded nut, nut bolt, axle with through-hole and fastener adapted for fitting therein, or various other suitable fasteners may be used.

The engagement of fastener 608 with axle 102 secures wheel hub 606 onto axle 102 by preventing the axle 102 from being withdrawn from axle receiving bore 708 of wheel hub 606. In turn, the engagement of the wheel hub 606 with wheel 104 serves to mount wheel 104 onto axle 102.

In the illustrated embodiment of wheel assembly 600, the shape, configuration and dimension of the axle 102, wheel 104 and wheel hub 606 are configured so that the end 108 of axle 102 projects past outer face 208 of wheel 104 when the wheel hub 606 is mounted onto the axle 102. The extending of the axle 102 past the outer face 208 of wheel 104, increases the performance of wheel 104 with respect to rotational loads or torque placed upon or exerted on the wheel 104. However, additional embodiments of wheel assembly 600 may be adapted and configured so the end 108 of axle 102 does not project past the outer face 208 of wheel 104 when the wheel hub 606 is mounted onto the axle 102. To remove wheel assembly 600 from axle 102, fastener 608 is removed from the axle 102 and the wheel hub 606 can slide off of axle 102.

Wheel 104 of wheel assembly 100 and 600 is adapted to receive either axle-engaging wheel hub 106 of wheel assembly 100 or wheel hub 606 and fastener 608 of wheel assembly 600. In this manner, a wheel assembly system is provided that can be adapted to use either an axle-engaging wheel hub or a wheel hub adapted for use with an additional fastener to mount wheels to axle of the wheel assembly. Accordingly, if an assembler of a wheeled container or other device including a wheel assembly desires to assemble the wheel assembly without the need for additional fasteners, an axle-engaging wheel hub as described herein may be selected, inserted into wheel and the wheel/wheel hub assembly can then be mounted to an axle. Conversely, if an assembler of a wheeled container or other device including a wheel assembly desires to use an additional fastener to mount the wheels to an axle, a wheel hub adapted for use with an additional fastener, as described herein, may be selected. In this manner, a single wheel design and single axle design can be used to mount wheels of a wheel assembly to an axle using an axle-engaging wheel hub or with the use of a wheel hub adapted for use with an additional fastener depending upon the desires of the assembler in connection with various factors that an assembler may consider, such as cost considerations, assembly time, tools available, ability and experience of assembler, desired functionality and characteristics of the wheel assembly, etc.

When an assembler determines whether an axle-engaging hub or a wheel hub adapted for use with an additional fastener will be used to mount a wheel to an axle a variety of different criteria may be considered. Generally, a wheel hub adapted for use with an additional fastener may create a stronger engagement with the axle, as the fastener 608 used often grips the axle 102 with a greater force than the engagement of the lug portion 326 of the cantilevered arms 322 with the notches 110 defined in the axle 102. Generally, the embodiments of wheel hub adapted for use with an additional fastener disclosed herein are less costly to produce than the embodiments of axle-engaging wheel hub disclosed herein due to the amount of material and molding process necessary to produce the axle-engaging wheel hub and the wheel hub adapted for use with an additional fastener. However, a wheel hub adapted for use with an additional fastener is usually not as easy to remove from an axle as axle-engaging wheel hub and pliers or other tools are usually required to remove the fastener from the axle. Furthermore, once such a fastener is removed from the axle, it is generally not reusable and must be replaced. Also, depending upon the type of fastener used, the fastener may rust, corrode or otherwise degrade over time. Conversely, the embodiments of axle-engaging hub disclosed herein are generally easier to remove than the embodiments of wheel hub adapted for use with an additional fastener disclosed herein and may be removed without the use of tools and are reusable once removed from an axle.

In yet additional embodiments of wheel assembly, one particular wheel design may be provided for use with a snap-on or axle-engaging wheel hub, and wheels of another particular design are employed with wheel hubs adapted for use with an additional fastener to attach the wheels to an axle. Accordingly, it should be understood that the various combinations and sub-combinations of the various components described herein may be employed together in additional embodiments.

The use of separate wheel 104 and insertable wheel hubs 106, 606 allows for the wheel and hubs to each be formed from different materials and produced through different molding processes if desired. For example, various embodiments of wheel 104 according to the present invention may be formed of High Density Polyethylene (HDPE) and produced by a blow molding process. Various embodiments of wheel hub 106 may be formed of an engineered material including nylon 66 and impact modifiers using an injection molding process and various embodiments of wheel hub 606 may be formed of High Density Polyethylene (HDPE) using an injection molding process. The use of wheel hubs which are formed separately of the wheel allows for the use of different materials and production methods to be used to produce the various components. For example, stronger materials or different molding methods may be desired for use in forming the wheel hubs, as they may experience more stress and strain in use than the remainder of the wheel. As stronger materials may be more costly than alternative materials, it may not be desirable to form the entire wheel from such materials, as the additional cost necessary to do so may outweigh the benefits of added strength gained by the use of such materials or such added strength may not be necessary for all areas of the wheel. In various embodiments, a variety of wheel hubs may be provided, each wheel hub possessing a different strength, or other characteristic, than the other wheel hubs. An assembler of the wheel assembly may then select the wheel hub with the characteristics, such as a particular strength or durability, that are desired in connection with a particular wheel assembly. Accordingly, one wheel design may be used and the performance and characteristics of the wheel assembly may be selected and adapted as desired, by an assembly, based upon the selection of the wheel hub that is inserted into the wheel.

In addition, the use of wheel hubs which are formed separately from the wheel allows for the adaptation of the wheel hubs to accommodate a variety of sizes and types of axles if desired. For example, various wheel hubs may be provided, each for use with an axle having a particular diameter. An assembler may then select the appropriate wheel hub for the diameter of the axle that is to be used for a particular wheel assembly during assembly of the wheel assembly. In this manner, one wheel design may be adapted for use with a variety of different axles based on the selection of the wheel hub which is inserted into the wheel. The axle of the illustrated embodiments of wheel assembly has a diameter of approximately ⅝ of an inch. However, in additional embodiments, the axle may have a ½ inch diameter, or a variety of other suitable diameter dimensions.

While the present invention has been illustrated by the description of embodiments thereof, and while the embodiments have been described in considerable detail, it is not the intention of the applicants to restrict or in any way limit the scope of the invention to such details. Additional advantages and modifications will readily appear to those skilled in the art. For example, where components are releasable or removably connected or attached together, any type of releasable connection may be suitable including for example, locking connections, fastened connections, tongue and groove connections, etc. Still further, component geometries, shapes, and dimensions can be modified without changing the overall role or function of the components. Therefore, the inventive concept, in its broader aspects, is not limited to the specific details, the representative apparatus, and illustrative examples shown and described. Accordingly, departures may be made from such details without departing from the spirit or scope of the applicant's general inventive concept.

While various inventive aspects, concepts and features of the inventions may be described and illustrated herein as embodied in combination in the exemplary embodiments, these various aspects, concepts and features may be used in many alternative embodiments, either individually or in various combinations and sub-combinations thereof. Unless expressly excluded herein all such combinations and sub-combinations are intended to be within the scope of the present inventions. Still further, while various alternative embodiments as to the various aspects, concepts and features of the inventions—such as alternative materials, structures, configurations, methods, devices and components, alternatives as to form, fit and function, and so on—may be described herein, such descriptions are not intended to be a complete or exhaustive list of available alternative embodiments, whether presently known or later developed. Those skilled in the art may readily adopt one or more of the inventive aspects, concepts or features into additional embodiments and uses within the scope of the present inventions even if such embodiments are not expressly disclosed herein. Additionally, even though some features, concepts or aspects of the inventions may be described herein as being a preferred arrangement or method, such description is not intended to suggest that such feature is required or necessary unless expressly so stated. Still further, exemplary or representative values and ranges may be included to assist in understanding the present disclosure, however, such values and ranges are not to be construed in a limiting sense and are intended to be critical values or ranges only if so expressly stated. Moreover, while various aspects, features and concepts may be expressly identified herein as being inventive or forming part of an invention, such identification is not intended to be exclusive, but rather there may be inventive aspects, concepts and features that are fully described herein without being expressly identified as such or as part of a specific invention, the inventions instead being set forth in the appended claims. Descriptions of exemplary methods or processes are not limited to inclusion of all steps as being required in all cases, nor is the order that the steps are presented to be construed as required or necessary unless expressly so stated.

The invention claimed is:

1. An assembly, comprising:
    an axle comprising a notch;
    a wheel comprising a bore; and
    a hub positionable in the bore, wherein the hub comprises:
        a body; and
        a cantilevered arm integrally formed with and extending from the body, wherein a portion of the cantilevered arm is structured to snap-fit into the notch in the axle.

2. The assembly of claim 1, wherein the hub comprises an injection-molded hub.

3. The assembly of claim 2, wherein the wheel comprises a blow-molded wheel.

4. The assembly of claim 1, wherein the hub further comprises a rib extending from the body, and wherein the rib is structured to engage the wheel.

5. The assembly of claim 1, further comprising a container.

6. The assembly of claim 5, wherein the container comprises a rotationally-molded container.

7. An assembly, comprising:
    an axle;
    a wheel, comprising:
        an outside surface;
        an inside surface; and
        a wheel bore extending through the wheel from the outside surface to the inside surface;
    a hub positionable in the wheel bore, wherein the hub comprises a hub bore, and wherein the axle is positionable through the hub bore; and
    a fastener structured to engage a portion of the axle extending past the outside surface of the wheel.

8. The assembly of claim 7, wherein the hub further comprises a rib extending from the body, wherein the rib is structured to engage the inside surface of the wheel.

9. The assembly of claim 7, wherein the axle comprises a notch, and wherein the fastener comprises a tab structured to engage the notch.

10. The assembly of claim 7, wherein the hub comprises an injection-molded hub.

11. The assembly of claim 10, wherein the wheel comprises a blow-molded wheel.

12. The assembly of claim 7, further comprising a container.

13. The assembly of claim 12, wherein the container comprises a rotationally-molded container.

14. An assembly, comprising:
    a wheel, comprising:
        an outside surface;
        an inside surface; and
        a bore extending through the wheel from the outside surface to the inside surface; and
    a hub positionable in the bore, wherein the hub comprises an outwardly-protruding rib structured to engage the inside surface of the wheel when the hub is positioned in the bore.

15. The assembly of claim 14, wherein the hub comprises an injection-molded hub.

16. The assembly of claim 14, wherein the wheel comprises a blow-molded wheel.

17. The assembly of claim 14, further comprising a container.

18. A hub for rotatably securing a wheel to an axle, wherein the hub comprises:
    an injection-molded body, comprising:
        a bore defined through the injection-molded body;
        a wheel-engaging rib extending outwardly from the injection-molded body; and
        a cantilevered arm integrally formed with and extending from the injection-molded body, wherein a portion of the cantilevered arm extends into the bore.

19. An assembly, comprising:
    an axle;
    a blow-molded wheel comprising a bore; and
    an injection-molded hub positionable in the bore, wherein the injection-molded hub is structured to snap-fittingly engage the axle.

20. The assembly of claim 19, further comprising a container.

21. The assembly of claim 20, further comprising:
    a second blow-molded wheel comprising a second bore; and
    a second injection-molded hub positionable in the second bore, wherein the second injection-molded hub is structured to snap-fittingly engage the axle.

* * * * *